United States Patent
Cai et al.

(10) Patent No.: US 12,436,888 B2
(45) Date of Patent: *Oct. 7, 2025

(54) ROUTING CIRCUIT FOR COMPUTER RESOURCE TOPOLOGY

(71) Applicant: Apple Inc., Cupertino, CA (US)

(72) Inventors: Qiong Cai, Menlo Park, CA (US); Emiliano Morini, Folsom, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,917

(22) Filed: Jun. 19, 2024

(65) Prior Publication Data

US 2024/0403214 A1    Dec. 5, 2024

Related U.S. Application Data

(63) Continuation of application No. 18/296,861, filed on Apr. 6, 2023, now Pat. No. 12,050,532.

(60) Provisional application No. 63/376,815, filed on Sep. 23, 2022.

(51) Int. Cl.
  *G06F 12/08*    (2016.01)
  *G06F 7/72*    (2006.01)
  *G06F 12/0802*  (2016.01)

(52) U.S. Cl.
  CPC .......... *G06F 12/0802* (2013.01); *G06F 7/727* (2013.01)

(58) Field of Classification Search
  CPC .............................. G06F 12/0802; G06F 7/727
  See application file for complete search history.

(56) References Cited

U.S. PATENT DOCUMENTS

| | | |
|---|---|---|
| 11,061,727 B1 | 7/2021 | Gnyp et al. |
| 2007/0088910 A1* | 4/2007 | Parthasarathy ........ G11C 15/04 711/108 |
| 2008/0112412 A1 | 5/2008 | Pong |
| 2010/0211721 A1 | 8/2010 | Resnick |
| 2011/0296078 A1 | 12/2011 | Khan et al. |
| 2012/0054365 A1 | 3/2012 | Wu |
| 2013/0307859 A1 | 11/2013 | Johnson |
| 2014/0164655 A1 | 6/2014 | Alfieri |

(Continued)

OTHER PUBLICATIONS

International Search Report and Written Opinion in PCT Appl. No. PCT/US2023/032321 mailed Dec. 29, 2023, 9 pages.

*Primary Examiner* — Jae U Yu
(74) *Attorney, Agent, or Firm* — Kowert, Hood, Munyon, Rankin & Goetzel, P.C.; Dean M. Munyon

(57) ABSTRACT

A routing circuit for an integrated circuit configured to access a set of resources that are organized according to a topology with a plurality of dimensions. The routing receives a request for a particular resource of the set of resources that includes an address that includes first and second sets of bits, the topology having a first dimension with n routing options (where n is not a power of two) and a second dimension with m routing options. The routing circuit determines first and second routing selections for the first and second dimensions by performing respective modulo-n and div-n operations on values formed from the address that include the first and second set of bits. The routing circuit then activates one or more selection signals in accordance with the first and second routing selections that are usable to cause the particular resource to be selected in response to the request.

20 Claims, 28 Drawing Sheets

(56) References Cited

U.S. PATENT DOCUMENTS

| | | |
|---|---|---|
| 2017/0090791 A1 | 3/2017 | Grubisc et al. |
| 2019/0042401 A1 | 2/2019 | Khan et al. |
| 2020/0034306 A1 | 1/2020 | Luo et al. |
| 2020/0142830 A1 | 5/2020 | Natanzon et al. |
| 2020/0264778 A1 | 8/2020 | Yang et al. |
| 2021/0133117 A1 | 5/2021 | Shabi et al. |

* cited by examiner

320

| PA | 6 5 | 4 3 | 2 | 1 | 0 |
|---|---|---|---|---|---|
| | y2 | b | c1 | y1 | c2 |
| Mp = 0x62 | 1 1 | 0 0 | 0 | 1 | 0 |
| Mr = 0x62 | 1 1 | 0 0 | 0 | 1 | 0 |
| β1 = 0x08 | 0 0 | 0 1 | 0 | 0 | 0 |
| β2 = 0x10 | 0 0 | 1 0 | 0 | 0 | 0 |
| Mc = 0x05 | 0 0 | 0 0 | 1 | 0 | 1 |

Routing of 2d
2d = 000 0010b

Plane routing: 000 0010b & Mp =000 0001b = 2d
mod3(2) = 2
plane = 2

Bank routing:
000 0010 & β1 = 000 0000. Extract 0.
000 0010 & β2 = 000 0000. Extract 0.
bank = {00} = 0

Row routing: 000 0010 & Mr = 000 0010b
Extract: 001 = 1d
div3(1) = 0
row = 0

Column routing: 000 0010 & Mc = 000 0000.
Extract 00.
Col = 0

2d ⟶ (plane=2, bank=0, row=0, column=0)

Routing of 32d
2d = 010 0000b

Plane routing: 010 0000b & Mp =010 0000b = 32d
mod3(32) = 2
plane = 2

Bank routing:
010 0000 & β1 = 000 0000. Extract 0.
010 0000 & β2 = 000 0000. Extract 0.
bank = {00} = 0

Row routing: 010 0000 & Mr = 010 000b
Extract: 010 = 2d
div3(2) = 0
row = 0

Column routing: 010 0000 & Mc = 000 0000.
Extract 00.
Col = 0

32d ⟶ (plane=2, bank=0, row=0, column=0)

| PA | 7 6 | 5 4 | 3 2 | 1 0 |
|---|---|---|---|---|
|  | y2 | b | p | c |
| Mp = 0x0C | 0 0 | 0 0 | 1 1 | 0 0 |
| Mr = 0xC0 | 1 1 | 0 0 | 0 0 | 0 0 |
| β1 = 0x10 | 0 0 | 0 1 | 0 0 | 0 0 |
| β2 = 0x20 | 0 0 | 1 0 | 0 0 | 0 0 |
| Mc = 0x03 | 0 0 | 0 0 | 0 0 | 1 1 |

Routing of 0d
0d = 0000 000b

Plane routing: 0000 0000b & Mp = 0000 0000b = 0d
mod3(0) = 0
plane = 0

Bank routing:
0000 0000 & β1 = 000<u>0</u> 0000. Extract 0.
0000 0000 & β2 = 00<u>0</u>0 0000. Extract 0.
bank = {00} = 0

Row routing: 000 0000 & Mr = 0000 00<u>00</u>b
Extract: 00 = 0d
div3(0) = 0
row = 0

Column routing: 000 0000 & Mc = 000 00<u>00</u>.
Extract 00.
Col = 0

0d ———▶ (plane=0, bank=0, row=0, column=0)

Routing of 12d
12d = 0000 1100b

Plane routing: 0000 1100b & Mp = 0000 1100b = 12d
mod3(12) = 0
plane = 0

Bank routing:
0000 1100 & β1 = 000<u>0</u> 0000. Extract 0.
0000 1100 & β2 = 00<u>0</u>0 0000. Extract 0.
bank = {00} = 0

Row routing: 000 1100 & Mr = 0000 00<u>00</u>b
Extract: 00 = 0d
div3(0) = 0
row = 0

Column routing: 000 1100 & Mc = 000 00<u>00</u>.
Extract 00.
Col = 0

12d ———▶ (plane=0, bank=0, row=0, column=0)

FIG. 3D

| $x$ | $mod3(x)$ |
|---|---|
| 0d, 0000d | 0d |
| 1d, 0001b | 1d |
| 2d, 0010b | 2d |
| 3d, 0011b | 0d |
| 4d, 0100b | 1d |
| 5d, 0101b | 2d |
| 6d, 0110b | 0d |
| 7d, 0111b | 1d |
| 8d, 1000b | 2d |
| 9d, 1001b | 0d |
| 10d, 1010b | 1d |
| 11d. 1011b | 2d |
| 12d, 1100b | 0d |
| 13d, 1101b | 1d |
| 14d, 1110b | 2d |
| 15d, 1111b | 0d |

LUT3-M
410

FIG. 4A

| $x$ | $div3(x)$ |
|---|---|
| 0d, 0000d | 0d |
| 1d, 0001b | 0d |
| 2d, 0010b | 0d |
| 3d, 0011b | 1d |
| 4d, 0100b | 1d |
| 5d, 0101b | 1d |
| 6d, 0110b | 2d |
| 7d, 0111b | 2d |
| 8d, 1000b | 2d |
| 9d, 1001b | 3d |
| 10d, 1010b | 3d |
| 11d. 1011b | 3d |
| 12d, 1100b | 4d |
| 13d, 1101b | 4d |
| 14d, 1110b | 4d |
| 15d, 1111b | 5d |

LUT3-D4
510A

| $mod3(x)$ | $mod3(y)$ | $m = mod3(x) \cdot 16 + mod3(y)$ | $div3(m)$ |
|---|---|---|---|
| 0000b, 0d | 0000b, 0d | 0 | 0 |
| 0000b, 0d | 0001b, 1d | 0 | 0 |
| 0000b, 0d | 0010b, 2d | 0 | 0 |
| 0001b, 1d | 0000b, 0d | 16 | 5 |
| 0001b, 1d | 0001b, 1d | 17 | 5 |
| 0001b, 1d | 0010b, 2d | 18 | 6 |
| 0010b, 2d | 0000b, 0d | 32 | 10 |
| 0010b, 2d | 0001b, 1d | 33 | 11 |
| 0010b, 2d | 0010b, 2d | 34 | 11 |

LUT3-D8
510B

FIG. 5A

| $mod3(x)$ | $mod3(y)$ | $m = mod3(x) \cdot 256 + mod3(y)$ | $div3(m)$ |
|---|---|---|---|
| 0000 0000b, 0d | 0000 0000b, 0d | 0 | 0 |
| 0000 0000b, 0d | 0000 0001b, 1d | 0 | 0 |
| 0000 0000b, 0d | 0000 0010b, 2d | 0 | 0 |
| 0000 0001b, 1d | 0000 0000b, 0d | 256 | 85 |
| 0000 0001b, 1d | 0000 0001b, 1d | 257 | 85 |
| 0000 0001b, 1d | 0000 0010b, 2d | 258 | 86 |
| 0000 0010b, 2d | 0000 0000b, 0d | 512 | 170 |
| 0000 0010b, 2d | 0000 0001b, 1d | 513 | 171 |
| 0000 0010b, 2d | 0000 0010b, 2d | 514 | 171 |

LUT3-D16
510C

| $mod3(x)$ | $mod3(y)$ | $m = mod3(x) \cdot 65{,}536 + mod3(y)$ | $div3(m)$ |
|---|---|---|---|
| 0000 0000 0000 0000 0000b, 0d | 0000 0000 0000 0000 0000b, 0d | 0 | 0 |
| 0000 0000 0000 0000 0000b, 0d | 0000 0000 0000 0000 0001b, 1d | 0 | 0 |
| 0000 0000 0000 0000 0000b, 0d | 0000 0000 0000 0000 0010b, 2d | 0 | 0 |
| 0000 0000 0000 0000 0001b, 1d | 0000 0000 0000 0000 0000b, 0d | 65,536 | 21,845 |
| 0000 0000 0000 0000 0001b, 1d | 0000 0000 0000 0000 0001b, 1d | 65,537 | 21,845 |
| 0000 0000 0000 0000 0001b, 1d | 0000 0000 0000 0000 0010b, 2d | 65,538 | 21,846 |
| 0000 0000 0000 0000 0010b, 2d | 0000 0000 0000 0000 0000b, 0d | 131,072 | 43,690 |
| 0000 0000 0000 0000 0010b, 2d | 0000 0000 0000 0000 0001b, 1d | 131,073 | 43,691 |
| 0000 0000 0000 0000 0010b, 2d | 0000 0000 0000 0000 0010b, 2d | 131,074 | 43,691 |

LUT3-D32
510D

FIG. 5A Cont.

| $x$ | $mod15(x)$ |
|---|---|
| 0d, 0000d | 0d |
| 1d, 0001b | 1d |
| 2d, 0010b | 2d |
| 3d, 0011b | 3d |
| 4d, 0100b | 4d |
| 5d, 0101b | 5d |
| 6d, 0110b | 6d |
| 7d, 0111b | 7d |
| 8d, 1000b | 8d |
| 9d, 1001b | 9d |
| 10d, 1010b | 10d |
| 11d. 1011b | 11d |
| 12d, 1100b | 12d |
| 13d, 1101b | 13d |
| 14d, 1110b | 14d |
| 15d, 1111b | 0d |

LUT15-M
610 mod15(z) = mod15-F(x, y):

tmp_mod15 = mod15(x) + mod15(y)
{cout, tmp_mod15_p1} = mod15(x) + mod15(y) + 1 if cout = 0, mod15(z) = mod15(x) + mod15(y)
if cout = 1, mod15(z) = (mod15(x) + mod15(y) + 1)[3:0]

function mod15-F
611

| $x$ | $div15(x)$ |
|---|---|
| 0d, | 0d |
| 1d, | 0d |
| 2d, | 0d |
| 3d, | 0d |
| 4d, | 0d |
| 5d, | 0d |
| 6d, | 0d |
| 7d, | 0d |
| 8d, | 0d |
| 9d, | 0d |
| 10d, | 0d |
| 11d. | 0d |
| 12d, | 0d |
| 13d, | 0d |
| 14d, | 0d |
| 15d, | 1d |
| 16d | 1d |
| 17d | 1d |
| 18d | 1d |
| 19d | 1d |
| 20d | 1d |
| 21d | 1d |
| 22d | 1d |
| 23d | 1d |
| 24d | 1d |
| 25d | 1d |
| 26d | 1d |
| 27d | 1d |
| 28d | 1d |

LUT15-D4
710A

| $mod15(x)$ | $div15(16) \cdot mod15(x)$ |
|---|---|
| 0d, 0000d | 0d |
| 1d, 0001b | 1d |
| 2d, 0010b | 2d |
| 3d, 0011b | 3d |
| 4d, 0100b | 4d |
| 5d, 0101b | 5d |
| 6d, 0110b | 6d |
| 7d, 0111b | 7d |
| 8d, 1000b | 8d |
| 9d, 1001b | 9d |
| 10d, 1010b | 10d |
| 11d. 1011b | 11d |
| 12d, 1100b | 12d |
| 13d, 1101b | 13d |
| 14d, 1110b | 14d |

LUT15-D8
710B

FIG. 7A

| $mod15(x)$ | $div15(256) \cdot mod15(x)$ |
|---|---|
| 0d, 0000d | 0d |
| 1d, 0001b | 17d |
| 2d, 0010b | 34d |
| 3d, 0011b | 51d |
| 4d, 0100b | 68d |
| 5d, 0101b | 85d |
| 6d, 0110b | 102d |
| 7d, 0111b | 119d |
| 8d, 1000b | 136d |
| 9d, 1001b | 153d |
| 10d, 1010b | 170d |
| 11d. 1011b | 187d |
| 12d, 1100b | 204d |
| 13d, 1101b | 221d |
| 14d, 1110b | 238d |

LUT15-D16
710C

| $mod15(x)$ | $div15(65{,}536) \cdot mod15(x)$ |
|---|---|
| 0d, 0000d | 0d |
| 1d, 0001b | 4,369d |
| 2d, 0010b | 8,738d |
| 3d, 0011b | 13,107d |
| 4d, 0100b | 17,476d |
| 5d, 0101b | 21,845d |
| 6d, 0110b | 26,214d |
| 7d, 0111b | 30,583d |
| 8d, 1000b | 34,952d |
| 9d, 1001b | 39,321d |
| 10d, 1010b | 43,690d |
| 11d. 1011b | 48,059d |
| 12d, 1100b | 52,428d |
| 13d, 1101b | 56,797d |
| 14d, 1110b | 61,166d |

LUT15-D32
710D

Receiving, at a routing circuit of a computer system that includes a set of resources that are organized according to a topology with a plurality of dimensions, a request for a particular resource within the set of resources, the request including an address having a first set of bits and a second, non-overlapping set of bits, the topology having a first dimension with n routing options and a second dimension with m routing options, where n and m are both integers greater than two, and where n is a not a power of two
810

↓

Determining, by the routing circuit, a first routing selection for the first dimension by performing a modulo-n operation on a first value formed from the address, the first value including the first and second sets of bits
820

↓

Determining, by the routing circuit, a second routing selection for the second dimension by performing a div-n operation on a second value formed from the address, the second value including the first and second sets of bits
830

↓

Activating, by the routing circuit, one or more selection signals in accordance with the first and second routing selections, the one or more selection signals being usable to cause the particular resource to be selected in response to the request
840

FIG. 8

ROUTING CIRCUIT FOR COMPUTER RESOURCE TOPOLOGY

The present application is a continuation of U.S. application Ser. No. 18/296,861, entitled "Routing Circuit for Computer Resource Topology," filed Apr. 6, 2023, which claims priority to U.S. Provisional Appl. No. 63/376,815, filed Sep. 23, 2022, which is incorporated by reference herein in its entirety.

BACKGROUND

Technical Field

This disclosure relates generally to computer systems, and more generally to routing requests for computer resources in a topology with a dimension having a number of options not equal to a power of two.

Description of the Related Art

Modern computer systems have become extremely complex. There are many different types of resources within such systems, and given types of resources are often duplicated to achieve performance benefits. A memory system is one such example of a hierarchical set of resources within a computer system. Requests for these resources typically include an address that has to be interpreted in order to determine routing to the appropriate resource.

BRIEF DESCRIPTION OF THE DRAWINGS

The following detailed description makes reference to the accompanying drawings, which are now briefly described.

FIGS. 3C-D provide examples of aliasing issues that can occur in addressing a multi-dimensional topology.

FIG. 4A illustrates a lookup table that can be used to implement a mod-3 circuit.

FIG. 5A illustrates lookup tables that can be used to implement one embodiment of a div-3 circuit.

FIG. 7A illustrates lookup tables that can be used to implement one embodiment of a div-15 circuit.

FIG. 8 is a flow diagram illustrating one embodiment of method for performing routing selections for a set of resources that are organized according to a topology having a plurality of dimensions.

DETAILED DESCRIPTION OF EMBODIMENTS

A set of computer resources may be arranged in a topology such that each "dimension" in the topology has a number of possible options. The number of options in a given one of these dimensions is commonly equal to a power of two, since base-two arithmetic has long been a building block of computer architecture. The inventors, however, have recognized that it would be desirable to be able to accommodate a non-power-of-two number of routing options at one or more dimensions in a resource topology. Accordingly, when faced with a scenario in which a number of routing (or hashing) options n for a first dimension is desired, and n is not a power of two, first and second values may be generated from the request address for the first dimension and a second, different dimension in the topology. A series of mod-n operations may be performed on the first value in order to determine a routing selection for the first dimension, while a series of div-n operations may be performed on the second value (also utilizing mod-n results) in order to determine a routing selection for the second dimension. In this manner, an efficient routing may be achieved that does not leave "holes" in the address space. This approach may be particularly useful in a setting in which one dimension of a prior topology (e.g., in a previous product release) has been changed from a power-of-two value to a non-power-of-two value in a new topology (e.g., for a new product release).

Overview

Figure 1:
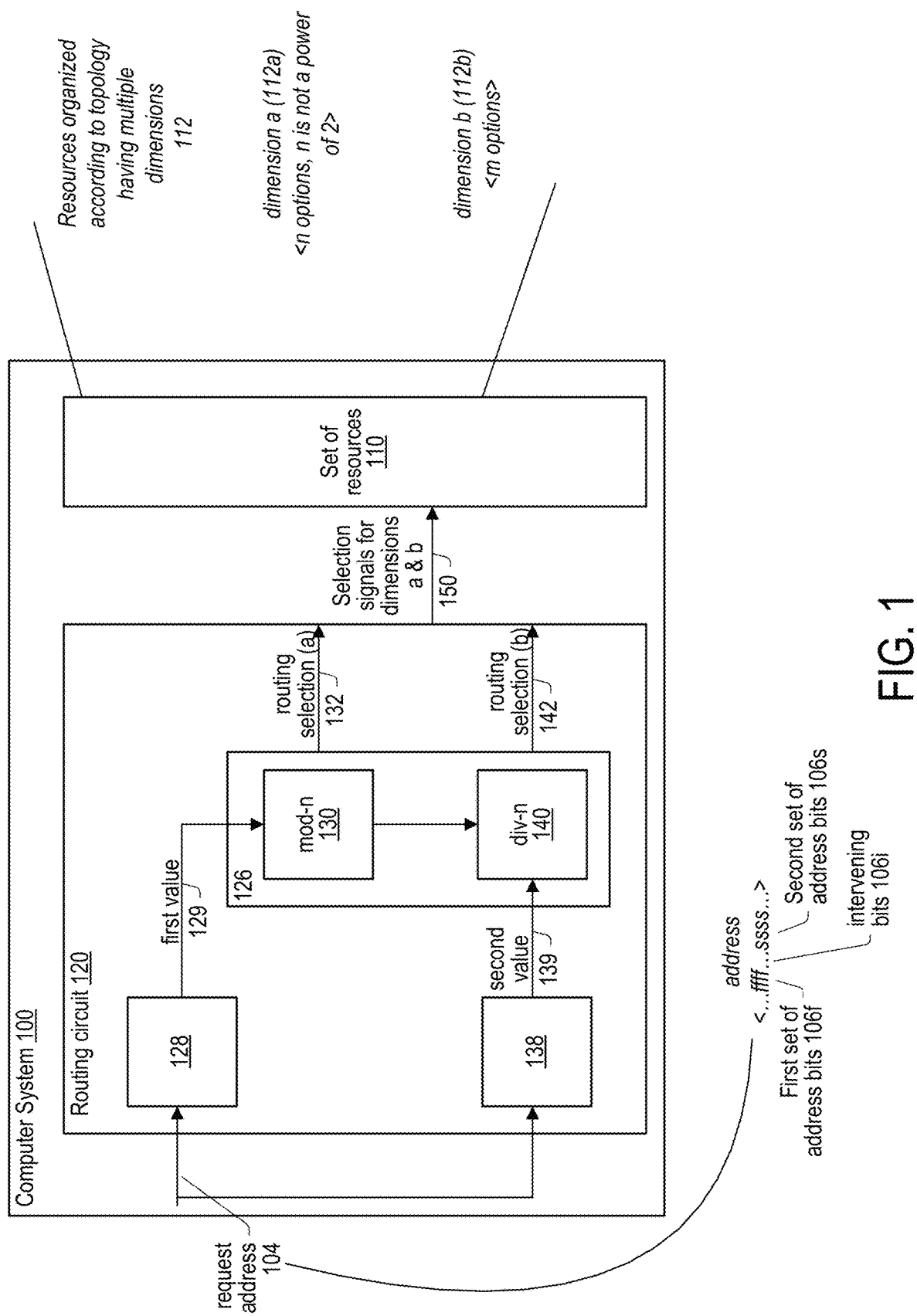
FIG. 1 is a block diagram of a routing circuit in a computer system that is configured to determine routing selections for a resource in a set of resources having a topology with multiple dimensions, at least one of which has a number of options that is not a power of two.
Figure 2:
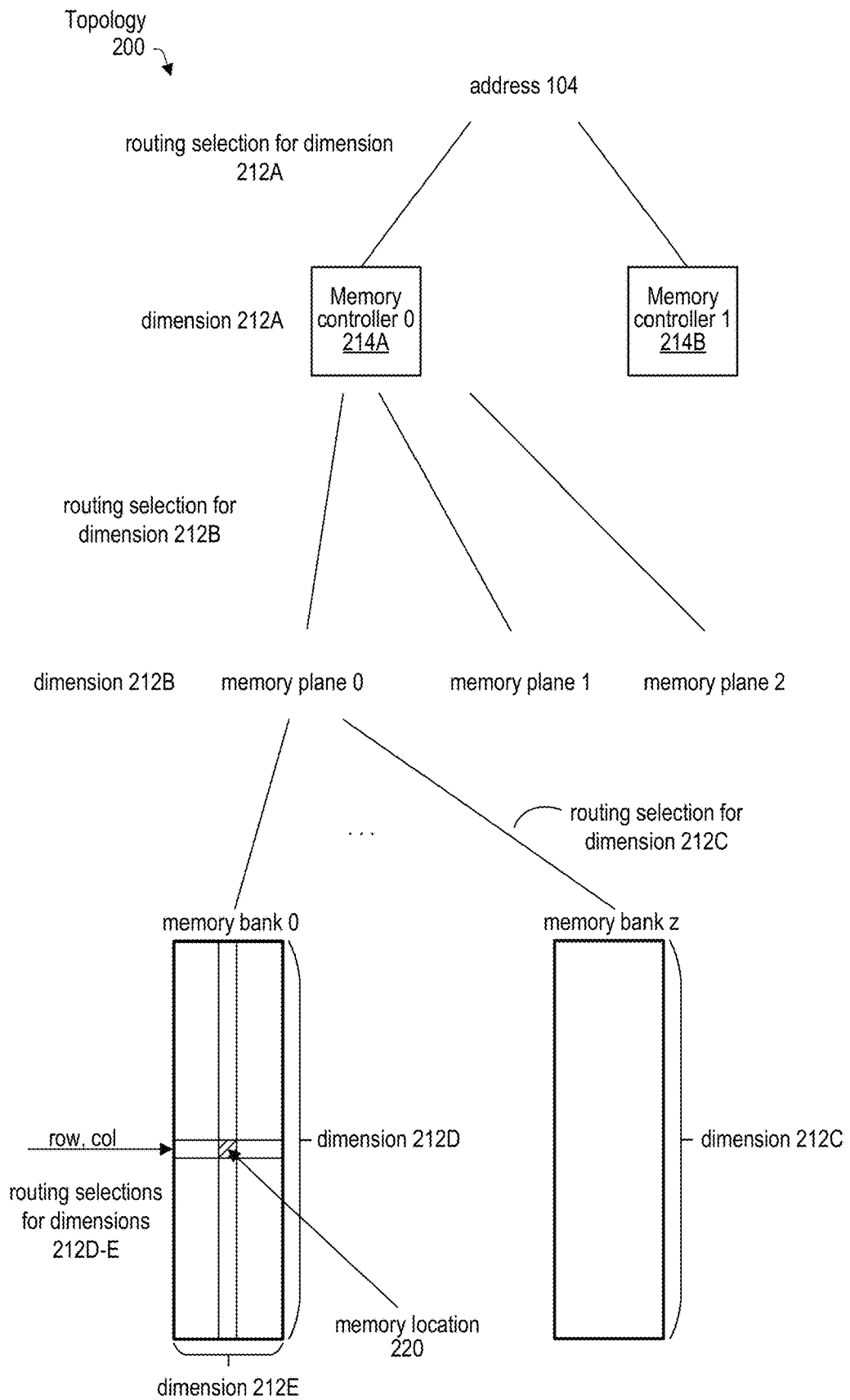
FIG. 2 is an example of a memory system as a set of resources with multiple dimensions.

This application begins, in the context of FIG. 1, with a general discussion of using mod-n and div-n operations to perform routing for a hierarchy having at least one dimension with a non-power-of-two-number of routing options. FIG. 2 describes a specific use case that pertains to resources within a memory system, and FIGS. 3A-B set forth examples of routing within such a use case. Examples of aliasing are described with respect to FIGS. 3C-D. The application next turns to specific possible mod-n and div-n implementations for mod 3 (FIGS. 4A-D); div 3 (FIGS. 5A-D); mod 15 (FIGS. 6A-D); and div 15 (FIGS. 7A-D). A flow diagram of a method for routing is described with respect to FIG. 8. An exemplary device on which the disclosed techniques can be employed (e.g., in computer circuitry) is described with respect to FIG. 9. Exemplary applications and platforms for such devices are described with respect to FIG. 10, while computer-readable media storing design information usable to fabricate computer circuitry configured to implement the disclosed techniques are described with respect to FIG. 11.

Non-Power of Two Hashing

This paradigm is illustrated in FIG. 1, which depicts a computer system 100 that includes a set of resources 110. Various entities within computer system 100 (which are not depicted) will require access to one or more of the resources in set 110. Accordingly, a requesting entity will generate a request for the resource(s) that includes request address 104. A routing circuit 120 within computer system 100 is configured to receive request address 104 and generate selection signals 150 that cause the requested resource to be selected for access.

As noted in FIG. 1, set of resources 110 is organized according to a topology having multiple dimensions. To use different terminology, set of resources 110 can also be thought of a hierarchy having different levels. An example organization of resources 110 is provided below with respect to FIG. 2. The set of resources 110 has at least two dimensions. Dimension a has n routing options (that is, routing circuit 120 needs to select one of n different possibilities for dimension a), where n is not a power of two. Thus, n might be 3, 5, or 6, but could not be 2, 4, 8, 16, etc. Dimension b is a different dimension with m routing options.

One possible option for routing dimension a is to use extra bits. For example, if n=3, 2 bits might be used for routing in this dimension. The inventors recognized, however, that this would be inefficient from a hashing perspective and that this would mean that a portion of the memory space addressed by request address 104 would not be mapped to one of the resources 110. That is, while address bits 00, 01, and 10 could be mapped to routing options 0, 1, and 2, address bits 11 would not map to a viable option.

Instead, the inventors propose to determine routing selections for dimensions a and b by utilizing a portion of request address 104 that corresponds to both dimensions a and b. As shown, address 104 has a first set of one or more bits 106f and a second set of one or more bits 106s that correspond to the number of options in dimensions a and b (i.e., n and m, respectively). Bits 106f may correspond to dimension a, and bits 106s to dimension b, or vice versa. As shown, there are intervening bits 106i between bits 106f and 106s in some cases, as the inventors have found that the hashing balance for dimension a (which has a non-power-of-two number of options) is better when more bits are used. There may also be bits in address 104 that are more significant than bits 106f and bits that are less significant than bits 106s.

Address 104 is supplied to blocks 128 and 138, which generate first value 129 and second value 139, respectively. (As will be described with respect to FIG. 3, blocks 128 and 138 may apply mask values to address 104 to generate first value 129 and second value 139. The masks used by blocks 128 and 138 may be the same or different.) First value 129 and second value 139 can be generated, in various embodiments, such that they include bits 106f and 106s. Values 129 and 139 are then supplied to an arithmetic circuit 126 that includes a mod-n circuit 130 and a div-n circuit 140.

Mod-n circuit 130 is configured to perform a mod-n operation on first value 129 to determine routing selection 132 for dimension a. Similarly, div-n circuit 140 is configured to perform a div-n operation on second value 139 to determine routing selection 142 for dimension b. As will be described below, in some implementations of arithmetic circuit 126, routing selections 132 and 142 may be determined together; for example, the div-n operation performed by circuit 140 may use results from the mod-n operation performed by circuit 130 (as shown by the arrow from circuit 130 to 140 in FIG. 1). For an example in which n=3 and m=2, routing selection 132 might be either 0, 1, or 2, while routing selection 142 might be either 0 or 1. This arrangement provides a more efficient distribution of routing decisions (that is, better hashing) for dimensions a and b than simply routing dimension a by itself using extra address bits.

In sum, FIG. 1 thus illustrates an apparatus that includes an integrated circuit that includes a set of storage locations (e.g., set of resources 110) arranged according to a hierarchy having a plurality of levels, including a first dimension (or level) having n hashing (or routing) options (n being a non-power-of-two integer) (e.g., dimension a) and a second dimension (level) having m hashing options (dimension b). The apparatus further includes a routing circuit (or hashing circuit) (e.g., routing circuit 120). This circuit is configured to receive a request to access a particular storage location of the set of storage locations, the request including an address (e.g., request address 104) having a first set of bits (106f) and a second, non-overlapping set of bits (106s). The routing circuit is also configured to determine a first hash value for the first level by performing a modulo-n operation on a first value formed from the address (e.g., using mod-n circuit 130). The routing circuit is further configured to determine a second hash value for the second level by performing a div-n operation on a second value formed from the address (e.g., using div-n circuit 130 and potentially information from mod-n circuit 130). Still further, the routing circuit is configured to generate a plurality of selection signals (e.g., selection signals 150) in accordance with the first and second hash values that are usable to cause the particular storage location to be selected.

Consider an example in which request address is a 10-bit value 01 0101 1110, which is in the form [9:0]. Suppose only bits [8:2] are of interest, and that bits [8:7] are bits 106f, bits [4:2] are bits 106s, and that bits [6:5] are bits 106i. In some embodiments, blocks 128 and 138 shown in FIG. 1 can be implemented using a mask value and combinatorial logic that includes an AND function (or its equivalent). In this example, a binary mask value of 01 1001 1100 could be ANDed with the 10-bit address, with the upper-most bit [9] and the two lower-most bits [1:0] discarded. (Alternately, only bits [8:2] may be ANDed with the 7-bit mask 1100111.)

Potential structure and exemplary operation for mod-n circuit 130 is described further below with respect to FIGS. 4A-D (in the case where n=3) and FIGS. 6A-D (in the case where n=15). Similarly, potential structure and exemplary operation for div-n circuit 140 is described further below with respect to FIGS. 5A-D (in the case where n=3) and FIG. 7A-D (in the case where n=15). FIG. 1 is not limited, however, to the n=3 and n=15 cases, which are provided as example implementations for non-power-of-two values of n.

FIG. 2 illustrates an exemplary set of resources 110. Here, the set of resources 110 corresponds to a memory system of computer system 100. The memory system has a topology 200 that includes five dimensions: memory controller dimension 212A, memory plane dimension 212B, memory bank dimension 212C, memory row dimension 212D, and memory column dimension 212E. Any type and number of dimensions is possible-a memory system is simply shown for illustrative purposes. A "memory plane," in this hierarchy, is the combination of the constituent memory banks and associated cache for those banks. Such an arrangement can lead to a more scalable memory than a single cache for all banks. Each memory plane can also have its own independent memory pipeline.

Consider a request for a memory location 220 that is based on address 104. To select memory location 220, five routing selections must be made, one for each dimension. First, a routing selection for dimension 212A is made. Dimension 212A in this example includes two memory controllers 214A-B. Second, a routing selection for dimension 212 B is made. Dimension 212 B in this example includes three memory planes: 0, 1, 2. Next, a routing selection for dimension 212C is made. Dimension 212C includes a number of memory banks ranging from 0 to z. Once a memory bank is selected, routing selections for dimension 212D (row) and 212E (column) are made.

Portions of address 104 can be used to make the various routing decisions for topology 200. For example, a single bit of address 104 might be used to select either memory controller 0 or 1. In some computer systems, the number of options for routing decisions for each dimension in topology 200 may all be equal to powers of 2 (e.g., 2 options in one dimension, 4 options in another dimension, 16 options in yet another dimension). But different versions of computer systems may have different configurations. Thus, while computer topologies are typically organized around powers of two, desired configurations may exist in which a topology has a dimension with a number of options that is not a power of two. Dimension 212B as shown in FIG. 2 has three options, for example. This topology might be motivated by a desire to expand the memory hierarchy by adding another plane to an existing topology having only two planes.

One possible solution is to use two bits to select the memory plane. Two bits can encode four possibilities (00, 01, 10, 11). The inventors have recognized, however, that this approach would create "holes" in the memory space since one of the four possibilities would never be selected. Another approach may be to completely redesign the routing logic. But because topology 200 may be a revision of a prior topology (e.g., the only change may be the addition of a third memory plane), there are advantages to retaining a portion of the existing routing logic rather than completely redesigning it from scratch. The techniques disclosed herein are thus particularly useful for modifying an existing design configured to select resources from a topology in which all levels have options that are powers of two. These techniques can thus be used in order to change one or more levels to have a non-power-of-two number of options without affecting those portions of the design that handle the levels that are unaffected in the change in topology.

Figure 3A:
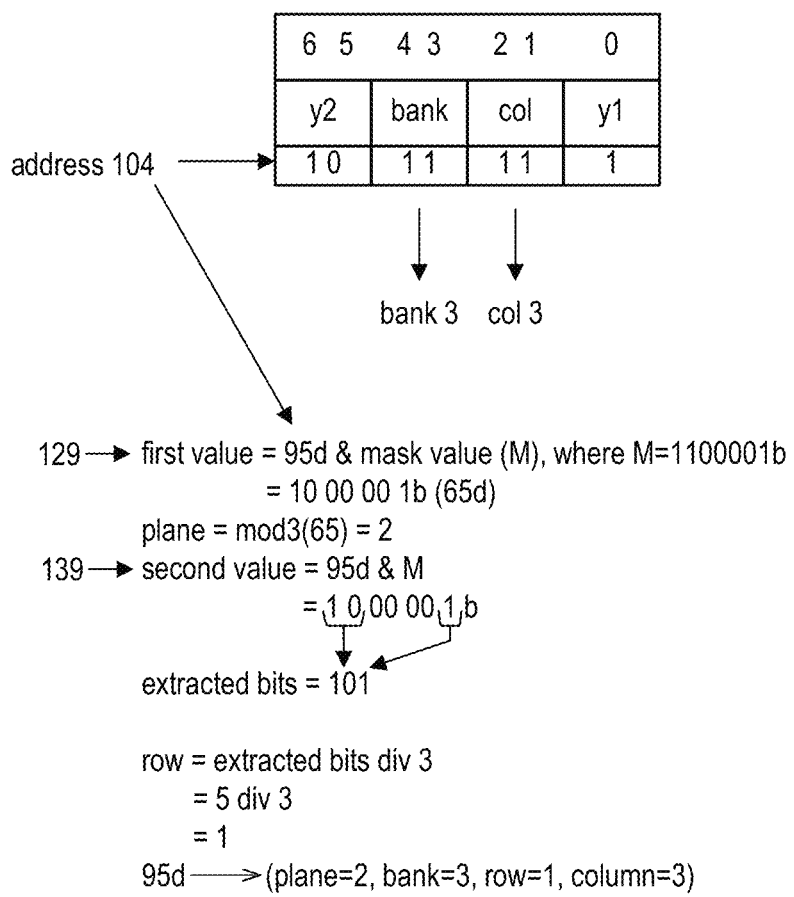
FIGS. 3A-B provide examples of routing in a multi-dimensional topology where one dimension has a number of options n, where n is not a power of two.

FIG. 3A provides an example 300 of routing in a topology that includes three memory planes, four memory banks per plane, four columns and two rows per bank. Accordingly, there will be 3×4×4×2=96 possible routings, which can be expressed as 0-95d. Example 300 shows how the value 95 might be routed.

In example 300, address 104 (which can be a physical address in one embodiment) has 7 bits, which are arranged in the format [6:0] as shown in FIG. 3A. Bits 6 and 5 correspond to set of bits 106f in FIG. 1 (labeled as y2 here), while bit 0 corresponds to set of bits 106s (labeled as y1 here). The existence of a single bit in y1 illustrates that a "set" can have one or more bits. Bits 4, 3, 2, and 1 correspond to set of bits 106i in FIG. 1.

Bits 3 and 4 are used for routing the memory bank dimension, which has 4 options, while bits 1 and 2 are used for routing the column dimension, which also has 4 options. An XOR-hashing technique can be applied to bits 3 and 4 to determine their values (e.g., address 104 can be successively masked with 0001000b and 0010000b, to determine the values of bits 3 and 4). This technique leads to a routing selection of bank 3. Similarly, XOR-hashing can be applied to bits 1 and 2, which leads to a routing selection of column 3 of bank 3.

The memory plane dimension and the row dimension are computed in a different manner. Block 128 applies a mask value M to address 104 to generate first value 129. In example 300, M is 1100001b, which has the effect of creating a 7-bit value in which bits 1-4 will necessarily be 0. Mask M in this example thus has the effect of zeroing out bits 106i from address 104. Bits 0, 5, and 6 will be 1 if a corresponding 1 is present in address 104. Because address 104 is equal to 1011111, a 1 is present at bits 0 and 6, but not bit 5. Accordingly, the application of mask value M to address 104 yields 1000001 for first value 129, which is equivalent to 65d. Mod-3 circuit 130 can then evaluate mod 3 (65), which yields a value of 2.

In example 300, a routing determination for the row dimension is computed in a somewhat similar manner. Block 128 applies mask value M to address 104 to generate second value 139, which is the same as first value 129 (65d). A bit extraction function may then be performed to obtain bits 6, 5, and 0 of second value 139 (101b, or 5d). Div-3 circuit 140 can then evaluate div 3(5), which yields a value of 1 for the row dimension.

Accordingly, 95d in example 300 is routed to memory plane 2, memory bank 3, row 1, and column 3.

In example 300, the same mask value is used to generate first value 129 and second value 139. The inventors have recognized, however, that it may be desirable in some cases to use a larger number of bits for one of the dimensions. The inventors found that such an approach adds entropy to the hash.

Figure 3B:
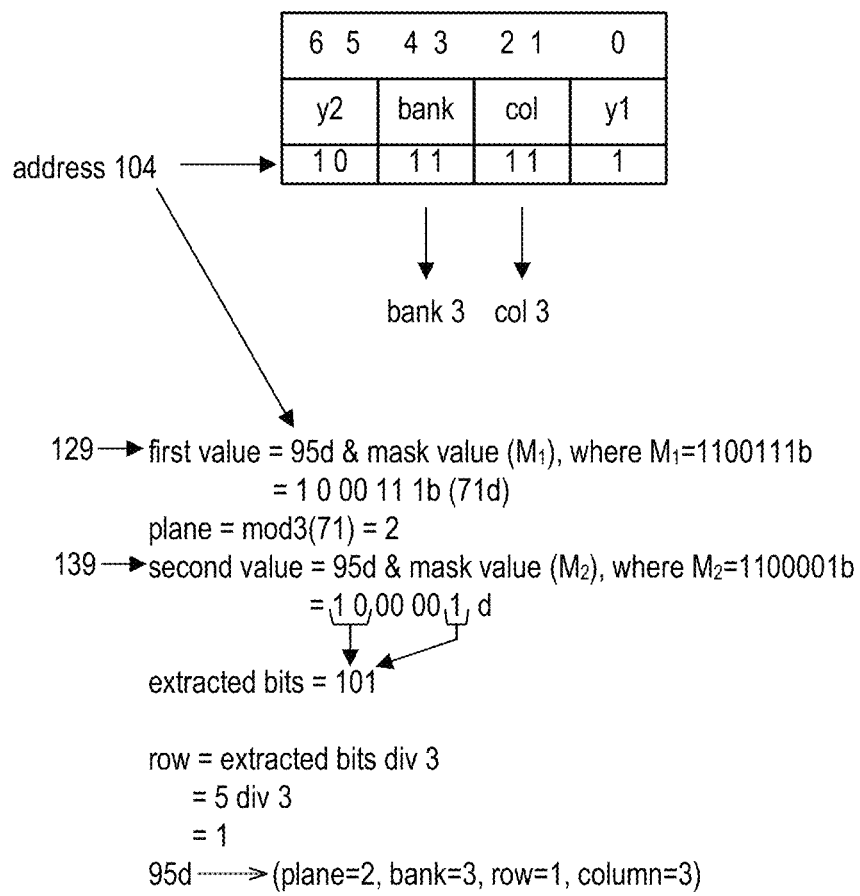

FIG. 3B provides an example 310 of routing that uses the same topology and address value (95d) as in example 300 in FIG. 3A. But in example 310, two different mask values are used to generate first value 129 and second value 139. Mask value $M_2$, which is used with respect to the row dimension, is the same as mask value M in example 300 (1100001). But mask value $M_1$, which is used for the plane dimension, includes more bits. $M_1$=1100111, where the underlined bits are added relative to $M/M_2$.

Accordingly, given an address in the form $<y_1 iiii_2>$, where y1 (106f) and y2 (106s) represent bits that are not masked off in the original mask and iiii (106i) represents intervening bits, additional intervening bits i can be added to the mask to increase hashing entropy.

Accordingly, first value 129 in example 310 is 71d, which also results in hashing to a selection of plane 2. Second value 139 is computed the same way as in example 300, and thus also results in a selection of row 1. Accordingly, 95d in example 310 is also routed to memory plane 2, memory bank 3, row 1, and column 3.

Aliasing

Another design concern is aliasing, in which two different addresses hash to the same set of routing determinations. For example, when two different addresses hash to the same plane, bank, row, and column, aliasing has occurred. The inventors have determined that certain constraints may be applied to the selection of bits in the address that are used for routing decisions, as well as to the selection of what masks are used.

These constraints may vary in different applications. Consider a continuation of the examples of the memory hierarchy of FIGS. 3A-B in which an address encodes a memory plane (which is determined by a mod-n operation), a memory row (which is determined by a div-n operation), a memory bank (determined by XOR hashing), and a memory column (which is determined by XOR hashing). One possible set of limitations on hashing include four separate constraints. First, the mask used for the plane dimension ($M_p$) is either equal to the row dimension ($M_r$) or the bits that are set in $M_r$ are a subset of the bits set in $M_p$. For example, $M_r$ could be 110 0001b, and $M_p$ could be 110 0111b. Second, any additional bits that are set in $M_p$ relative to $M_r$ should belong to the memory column dimension. Consider a 7-bit address in the form [6:0], in which bits [6:5] correspond to y2, bits [4:3] correspond to the bank dimension, bits [2:1] corresponds to the column dimension, and bit [0] corresponds to y1, where y2+y1 jointly encode the plane and row dimensions. In this scenario, 110 0001b and 110 0111b are valid values of $M_r$ and $M_p$ respectively. Third, while an arbitrary number of groups of ones in $M_r$ and $M_p$ are permitted (a "group" being a consecutive set of bits set to 1), between any two groups of ones in $M_p$, there must be an even number of zeros. Thus, 110 0001b and 110 0111b are also valid values of $M_r$ and $M_p$ respectively under this constraint, since in $M_p$=110 0111b, there are two zeros between the two groups of ones. Fourth, the highest and lowest bits in $M_r$ and $M_p$ coincide, and between the highest and lowest groups of ones in $M_r$, there must be an even number of extra ones in $M_p$. Once again, $M_r$=110 0001b and $M_p$=110 0111b satisfy this constraint. The highest and lowest groups of ones in $M_r$ are indicated as follows: 110 0001b. Between these groups of ones, there are two extra ones in $M_p$: 110 0111b.

FIG. 3C provides an example 320 in which $M_r$ and $M_p$ violate the constraints listed above. Constraint 3 is specifically not followed, as there are an odd number of zeros between y2 and y1. As can be seen in FIG. 3C, for these values of $M_r$ and $M_p$, the values 2 and 32 (in decimal) will both be hashed to the same plane (2), bank (0), row (0), and column (0).

Various other constraints can apply in other settings. For example, for an intervening set of bits 106i separating a more significant first set of bits 106f (which can also be referred to as y2) from a less significant second set of bits 106s (y1), the anti-aliasing constraints might require an even number of zeros and ones between y2 and y1.

FIG. 3D illustrates an example of how aliasing can occur. Example 330 addresses a simple scenario in which there are three memory planes, 4 banks per plane, four rows per bank, and 4 columns per row. An 8-bit address (which happens to be a physical address (PA) in this case) is used to encode memory row (bits [7:6]; labeled as y2), bank (bits [5:4]; b), plane (bits [3:2]; p), and column (bits [1:0]; c). Of note, two bits are used to encode the plane dimension. Further note that constraint 1 is violated, as $M_r$=1100 0000b and $M_p$=000 1100b. The bits that are set in $M_r$ are completely different from those set in $M_p$. In effect, the hashing of the plane dimension has been decoupled from the hashing of the row dimension, in contrast to the paradigm exemplified by FIGS. 3A-B. As can be seen in FIG. 3D, this results in aliasing: for these values of $M_r$ and $M_p$ the values 0 and 12 (in decimal) will both be hashed to the same plane (0), bank (0), row (0), and column (0).

FIG. 3D thus illustrates the problem in attempting to hash for a single dimension having a non-power-of-two-number of options from a group of address bits. For the case of n=3, using one bit is insufficient to generate 3 possible options. Using two (or more) bits with mod-3 arithmetic is problematic as illustrated in FIG. 3D, which shows that independently performing hashing for two dimensions on two different groups of bits with a non-power-of-two-number of options in one dimension can lead to aliasing.

This problem is particular problematic for physical memory. Consider a set of 8-bit values that address row, bank, plane, and column as in FIG. 3D wherein each 8-bit value is different. Each 8-bit value should address a different combination of row, bank, plane, and column. If this is not the case, as in FIG. 3D, the resulting aliasing can lead to data issues due to the conflicting mappings (overwrites, incorrect data, etc.). This aliasing also can result in certain portions of physical memory not being utilized.

The approach of the present disclosure, however, avoids these problems by using a set of bits (e.g., <106f><106i><106s>) to encode first and second dimensions, where the first dimension has n options (where n is a not a power of two) and is determined by a mod-n operation, and where the second dimension is determined by a div-n operation. This approach avoids aliasing because for a set of distinct address values (e.g., 8-bit values), the combination of mod-n and div-n will produce distinct values <mod-n, div-n>. Stated another way, given two different address values a1 and a2 and n being an integer greater than two, it will not be the case that mod n(a1)=mod n(a2) AND div n(a1)=div n(a2). In short, the combination of mod-n and div-n will produce a unique combination of mod-n/div-n when given different inputs (unlike FIG. 3D).

Accordingly, if a set of appropriate constraints specified at design time are followed, address aliasing should not occur. In some embodiments, routing circuit 120 can also include a checking circuit that verifies, at runtime, whether constraints are being violated or whether conditions that could lead to aliasing exist. Such a circuit can have the constraints/conditions stored in a memory, and can execute a program to verify that each constraint/condition is satisfied at different points in time—for example, before allowing a routing operation to occur.

Mod 3 and Div 3 Implementation

There are various ways to implement mod-n circuit 130 and div-n circuit 140 within arithmetic circuit 126 shown in FIG. 1. One possible implementation for n=3 (meaning that circuit 130 computes mod-3 operations and circuit 140 computes div-3 operations) relies on the recognition that mod-3 and div-3 operations for a number having a first bit width can be performed by mod-3 and div-3 operations on sub-portions of the number having a second, smaller bit width. This approach can be implemented using combinatorial and/or sequential logic, and, in some cases, lookup tables (LUTs). LUTs obviate the need to employ full modulo and divide circuits, which can be costly in terms of chip real estate.

Consider a binary number z of bit width $2^{k+1}$, where the most significant half of the bits of z is represented by x, and the least significant half of the bits of z is represented by y. For a bit width of 16 bits, k=3; for a bit width of 8 bits, k=2. In either case, $z = x \cdot 2^{2^k} + y$. The inventors have recognized that the following formulas can be used to find mod 3(z) and div 3(z):

(1) $\mod 3(z) = \mod 3(\mod 3(x) + \mod 3(y))$; and (2) $div\ 3(z) = div\ 3(x) \cdot 2^{2^k} + div\ 3(y) + div\ 3\left(\mod 3(x) \cdot 2^{2^k} + \mod 3(y)\right)$.

It can be seen that equation (1) relies on the mod-3 values of the constituent parts x and y, while equation (2) relies on both mod-3 and div-3 values of x and y.

As an example of mod-3 and div-3 computations on an 8-bit number, consider z=19d (0001 0011b), where x=1d=0001b and y=3d=0011b. An LUT can be consulted to determine that mod 3(x)=1, div 3(x)=0, mod 3(y)=0, and div 3(y)=1.

Equation (1) can be evaluated as follows to determine mod 3 (z=19d):

$$\mod 3(z) = \mod 3(\mod 3(0001b) + \mod 3(0000b)) = \mod 3(1 + 0) = 1.$$

Equation (2), on the other hand, can be broken into multiple components:

$$(2.1)\ div\ 3(x) \cdot 2^{2^k}\ (k=2);$$
$$(2.2)\ div\ 3(y);$$
$$(2.3) = \mod 3(x) \cdot 2^{2^k} + \mod 3(y);$$
$$(2.4) = div\ 3((2.3));\ and$$
$$div\ 3(z) = (2.1) + (2.2) + (2.4).$$

Div 3 (z=19d) can thus be evaluated as follows:

$$(2.1) = div\ 3(x) \cdot 2^{2^k} = 0000;\ Left\ shifted\ by\ 4 = 0000\ 0000b;$$
$$(2.2) = div\ 3(y) = 1d = 0001b;$$
$$\mod 3(x) \cdot 2^{2^k} = 0001;\ Left\ shifted\ by\ 4 = 0001\ 0000b = 16d;$$
$$\mod 3(y) = 0000b;$$
$$(2.3)\ \mod 3(x) \cdot 2^{2^k} + \mod 3(y) = 0001\ 0000b = 16d;$$
$$(2.4)\ div\ 3((2.3)) = div\ 3(16d) = 5d = 0101b;$$
$$div\ 3(z) = (2.1) + (2.2) + (2.4) = 0000\ 0000b + 0001m + 0101b = 6d;\ and$$
$$div\ 3(z) = 6d.$$

As previously mentioned, LUTs can facilitate computing mod-n and div-n values. FIG. 4A shows one embodiment of a LUT 410 that includes mod 3 values for each possible 4-bit binary number, and can be used for mod-3 and div-3 operations. LUT 410 is also referred to as LUT3-M to indicate that it stores mod-3 values, which distinguishes this LUT from other LUTs discussed later. LUT 410 is useful in computing mod 3 for large values of z by employing equation (1) as to constituent sub-portions of z. LUT 410 is relatively small and can advantageously provide fast lookup times.

Figure 4B:
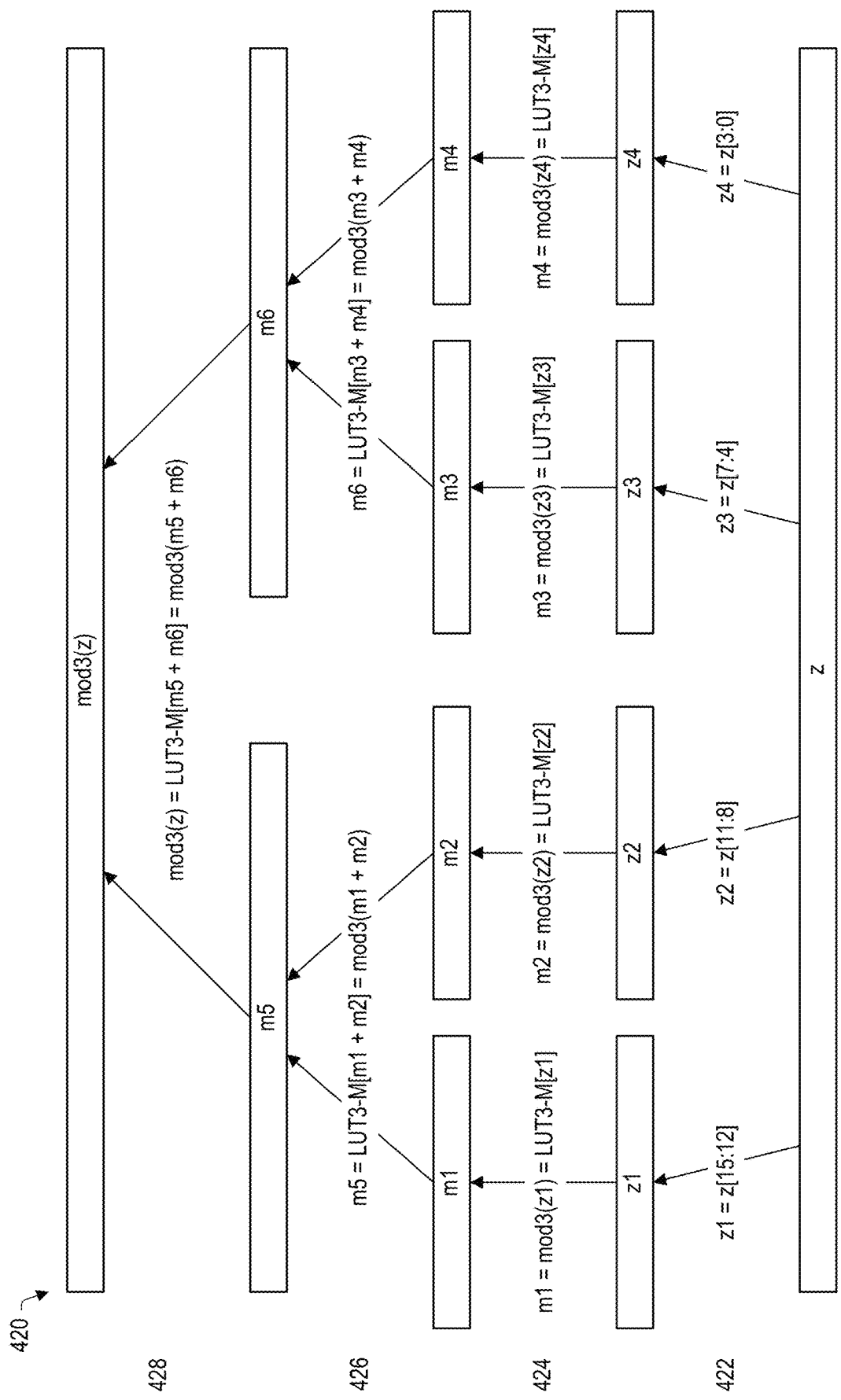
FIGS. 4B-C depict a method for performing a mod-3 operation on a number by a series of mod-3 operations on constituent parts of the number.

FIG. 4B illustrates method 420, in which LUT 410 can be used to calculate mod 3 for a 16-bit value, referred to as z. At 422, z is split into four 4-bit vectors z1 (z[15:12]), z2 (z[11:8]), z3 (z[7:4]) and z4 (z[3:0]). At 424, mod 3 is computed for z1-z4 using LUT 410; these values are stored as m1-m4, such that m1=mod 3(z1), m2=mod 3(z2), etc. In 426, equation (1) is used to combine m1 and m2 to compute mod 3 for {z1, z2} and combine m3 and m4 to compute mod 3 for {z3, z4}. The value m5 is computed by performing a lookup in LUT 410 to compute mod 3 for the sum of m1 and m2. Similarly, the value m6 is computed by performing a lookup in LUT 410 to compute mod 3 for the sum of m3 and m4. (Because m1-m4 have a maximum value of 2, the sums m1+m2 and m3+m4 will not exceed 15, and thus the mod-3 of these sums can be found in LUT 410.) This process repeats in 428, which includes performing a lookup in LUT 410 to compute mod 3 for the sum of m5 and m6. The result is mod 3(z).

This approach can be implemented for z of any width $2^{k+1}$. Specifically, given an input z, z can be padded with leading zeroes to get a vector of width $2^{k+1}$. Next, z can be split into blocks of four consecutive bits. Then, for each block of four consecutive bits, div 3 and mod 3 can be computed using an LUT. Pairs of consecutive 4-bit blocks can be combined to compute div 3 and mod 3 for 8-bit blocks according to equations (1) and (2). Subsequently, pairs of consecutive 8-bit blocks can be combined to compute div 3 and mod 3 for 16-bit blocks, again according to equations (1) and (2). The process of combining adjacent pairs of blocks is repeated until the result is for a value the length of z.

Method 420 thus illustrates a modulo-n operation in which n=3. Method 420 includes determining, at 422, a modulo-n value for each of equal sub-portions of the first value (z1-z4), which results in a current set of modulo-n results (m1-m4). Method 420 next includes combining, at 424, pairs of the current set of modulo-n results (e.g., combining m1/m2 and combining m3/m4) to obtain a new set of modulo-n results (m5, m6) having a greater number of bits than previous modulo-n results, with the new set of modulo-n results becoming the current set of modulo-n results. Still further, method 420 includes repeating, at 426, the combining of the current set of modulo-n results until the new set of modulo-n results has, at the output of 428, a single modulo-n result (m6), which is a final result of the modulo-n operation on the first value. In some embodiments the combining of 424 includes combining a given pair of the current set of modulo-n results corresponds to a first sub-portion of the address (denoted as x) and an immediately less significant sub-portion of the address (denoted as y), and combining generates a corresponding one of the new set of modulo-n results by computing the expression mod n(mod n(x)+mod n(y)).

Figure 4C:
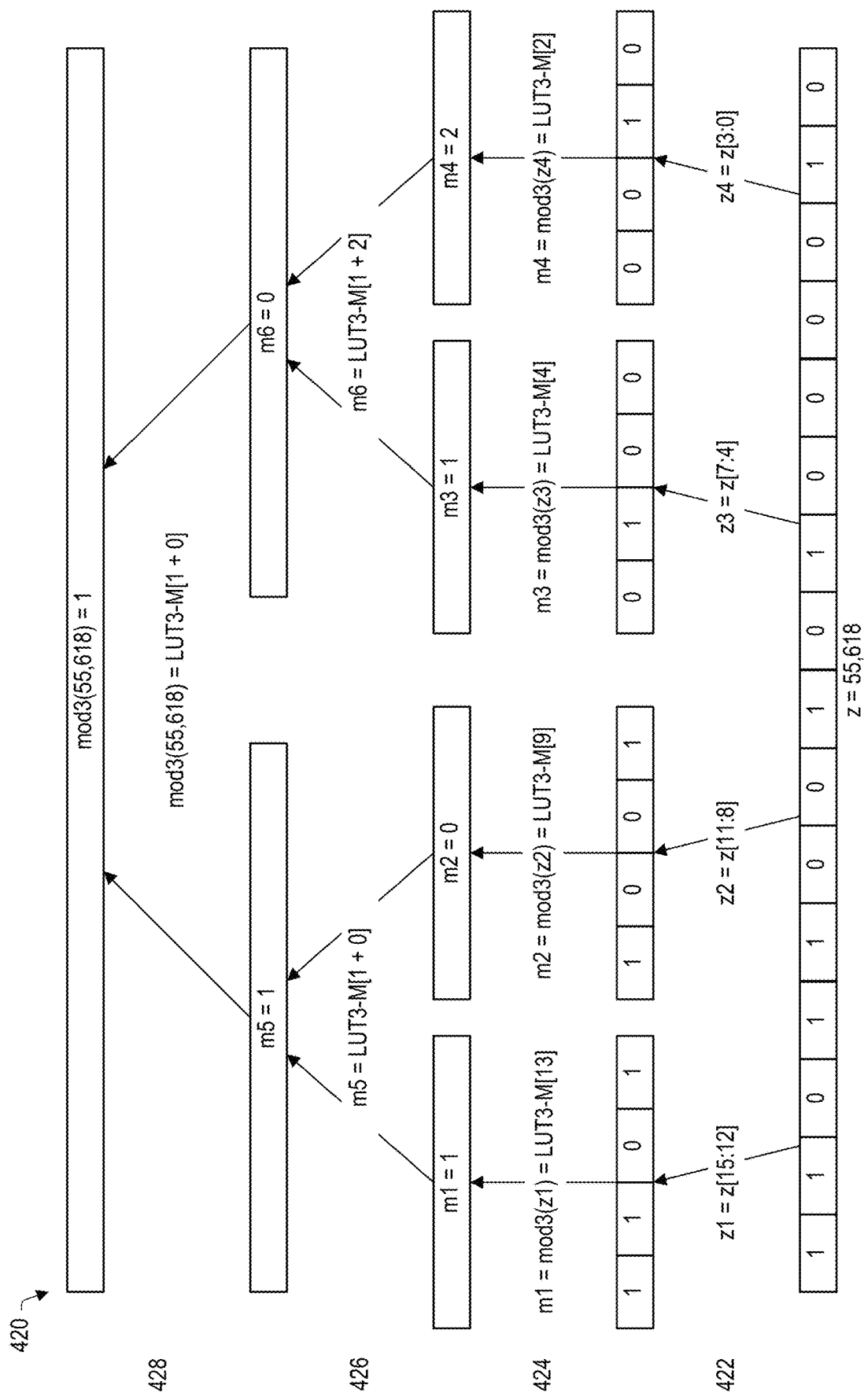

FIG. 4C illustrates the use of method 420 to compute mod 3 as to a specific number—in this case, z=55,618d, which can also be written as 1101 1001 0100 0010b. Three goes into this z value 18,539 times, leaving a remainder of 1. The same result can also be computed by method 420. In 422, the 16-bit value is split into four-bit portions, and in 424, LUT 410 is used to compute mod-3 values m1-m4 (1, 0, 1, and 2, respectively) using equation (1). This process repeats in 426, as m1 and m2 are added and then LUT 410 is used to compute mod 3 for the sum, yielding m5=1. Similarly, m3 and m4 are added and then LUT 410 is used to compute mod 3 for the sum, yielding m6=0. Finally, in 428, m5 and m6 are added and LUT 410 is again used to compute mod 3 for the sum, yielding mod 3 (z=55,618)=1.

The approach of method 420 can be used to compute mod 3 for any 16-bit binary number. Additionally, method 420 can be extended to compute mod 3 for larger values.

Figure 4D:
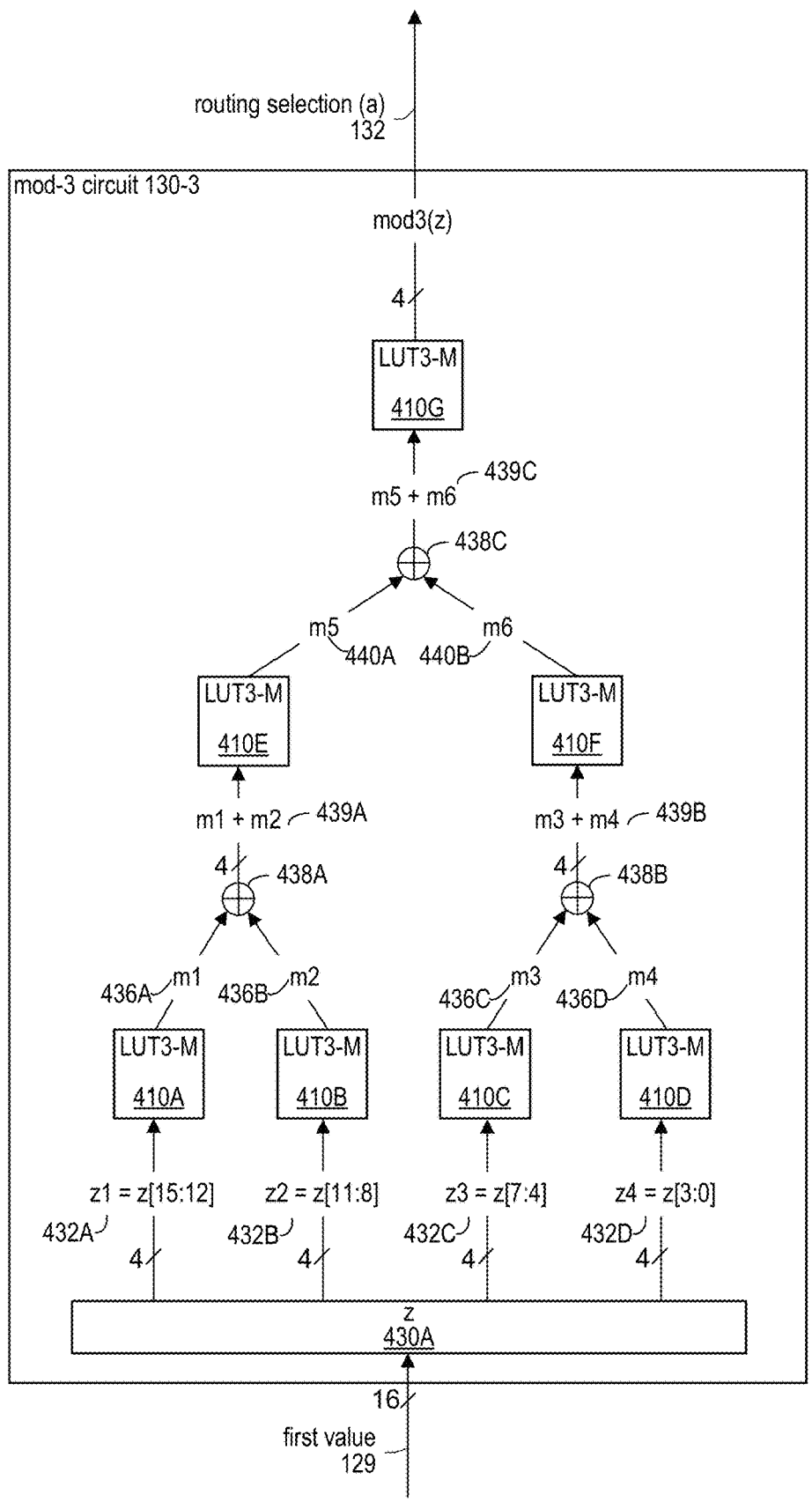
FIG. 4D illustrates one embodiment of a circuit that can be used to compute mod-3 for a number.

FIG. 4D illustrates an embodiment of a mod-3 circuit 130-3 that takes first value 129 (which is a 16-bit value) as an input and computes a 4-bit version of mod 3 of first value 129 as routing selection 132 for dimension a. As shown, mod-3 circuit 130-3 can be implemented using adders and LUT3-M (shown in FIG. 4D using reference numerals 410A-G).

Mod-3 circuit 130-3 stores first value in register 430A, which is denoted as variable z. Then, z is split into four 4-bit vectors 432A-D, representing z[15:12]), z[11:8]), (z[7:4]), and (z[3:0]) respectively. Vectors 432A-D are then provided to LUT3-M modules 410A-D. Each of lookup table modules 410 returns a mod-3 value as outputs 436A-D (also denoted as m1-m4). This approach eliminates the complexity of a customized mod-3 circuit, and is feasible since there are only a small number of values in the lookup table. The values 436A and 436B (m1 and m2) are summed using adder 438A, and 4-bit sum 439A is provided to another lookup table 410E, which outputs a value 440A (m5) corresponding to the mod-3 value of 432A concatenated with 432B (that is, z[15:8]). Similarly, 436C-D (m3 and m4) are provided to adder 438B to produce 4-bit sum 439B, which is provided to another lookup table 410F, which outputs 440B (m6). This value corresponds to the mod-3 value of 432C concatenated with 432D (that is, z[7:0]). Next, 440A and 440B (m5 and m6) are summed using adder 438C to output 4-bit sum 439C. Sum 439C is then provided to lookup table 410G, which outputs 4-bit routing selection 132, which corresponds to the mod-3 value of first value 129. This value can be used as the routing selection for dimension within the context of FIG. 1, for example.

In some embodiments, mod-3 circuit 130-3 may be used as a standalone circuit outside of arithmetic circuit 126 that is used to find the mod-3 value of any 16-bit input. Similarly, its output may be wired to any other circuit to efficiently produce mod-3 values for a given input. In some embodiments, other computing components are used to implement the same operations. For example, the value z in register 430A can be split into 4 equal vectors using a demultiplexer. Mod-3 circuit 130-3 may be implemented as a combinational circuit, but in other embodiments, it can be a sequential circuit whose sub-components (e.g., register 430A, LUTs 410A-G) are clocked. In the following embodiment, LUTs 410A-G are all separate LUTs, each with their own I/O, but in other embodiments, a single LUT (or a smaller number than in FIG. 4D) might compute mod-3 for all 4-bit values. In further embodiments, LUTs may be used to simplify even more operations. For example, a single 16-bit LUT may be used to replace LUTs 410A-B and adder 438A by storing all possible values of the computation mod 3(z1+z2), instead of independently computing 436A-B, 439A and 440A.

Figure 5B:
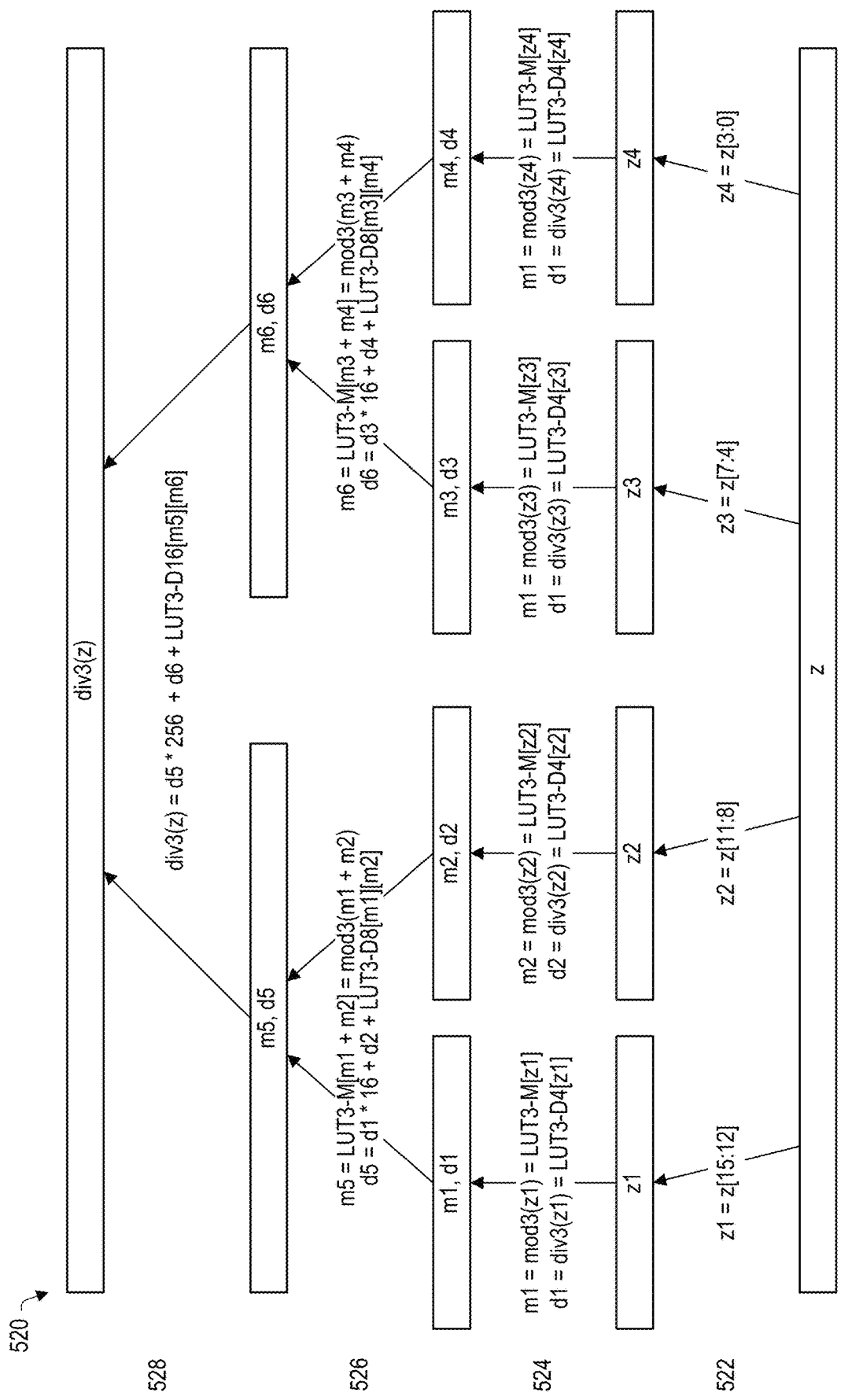
FIGS. 5B-C depict a method for performing a div-3 operation.

Turning to FIGS. 5A-D, LUT 410 can also be used in conjunction with other LUTs to compute div 3(z) according to equation (2). FIG. 5A shows multiple LUTs that may be used in one embodiment of a div 3(z) operation. LUT 510A (also referred to as LUT3-D4) includes div 3 value for each 4-bit binary number. LUT 510B (LUT3-D8) includes values of component (2.4) of equation (2) when x and y are 4 bits each. LUT 510C (LUT3-D16) includes values of component (2.4) when x and y are 8 bits each. LUT 510D (LUT3-D32) includes values of component (2.4) when x and y are 16 bits each. LUT 510A-D are useful in computing div 3 for large values of z by employing equation (2) as to constituent sub-portions of z.

FIG. 5B illustrates method 520, in which LUTs 410 and 510 can be used to calculate div3(z) for a 16-bit value. Similar to method 420, method 520 begins at 522, in which z is split into four 4-bit vectors z1 (z[15:12]), z2 (z[11:8]), z3 (z[7:4]) and z4 (z[3:0]). At 524, mod 3 is computed for z1-z4 using LUT 410 and div 3 is computed for z1-z4 using LUT 510A; these values are stored as m1-m4 and d1-d4, such that m1=mod 3(z1), m2=mod 3(z2), d1=div3(z1), d2=div3(z2), etc. In 526, equation (1) is used to combine m1 and m2 to find m5 and to combine m3 and m4 to find m6 (much as in 426 of method 420). Equation (2) uses d1, d2, m1, and m2 to compute div 3 for {z1, z2} (d5) and uses d3, d4, m3, and m4 to compute div 3 for {z3, z4} (d6). This process repeats in 528, which includes performing a lookup in LUT 510C to compute component (2.4) of equation (2) and sum it with d5*16 and d6. The result of the sum is div 3(z).

As with mod 3(z), div 3(z) can be implemented for z of any width $2k+1$ if appropriate LUTs are implemented. For example, LUT 510D can be used to find div 3(z) when z is 32 bits. LUTs of various widths can be utilized in arithmetic circuit 126 of routing circuit 120 as needed.

Method 520 thus illustrates a div-n operation in which n=3. Method 520 includes determining a div-n value for each of equal sub-portions of a value (z1-z4, from 522), resulting in a current set of div-n results at 524. The value here may be second value 139 from FIG. 1, for example. (Note that mod-n values for z1-z4 may be present. These may be separately determined in some embodiments, or "borrowed" from the performance of method 420 in other embodiments.) Method 520 continues, at 526, by combining pairs of the current set of div-n results to obtain a new set of div-n results having a greater number of bits than previous div-n results, the new set of div-n results becoming the current set of div-n results. In some embodiments, when computing an output div value (e.g., second value 139) having bit width $2^{2^{k+1}}$, a given pair of the current set of div-n results includes a first sub-portion of the address (x') and an immediately less significant sub-portion of the address (y'), and the combining of the given pair includes generates a corresponding one of the new set of div-n results by computing the expression div n(x'). $2^{2^k}$+div n(y')+div n(mod n(x')·$2^{2^k}$+mod n(y')). Still further, method 520 includes repeating, at 528, the combining of the current set of div-n results until the new set of div-n results has a number of bits equal to a number of bits of the second value, which results in div-n of the input value.

Figure 5C:
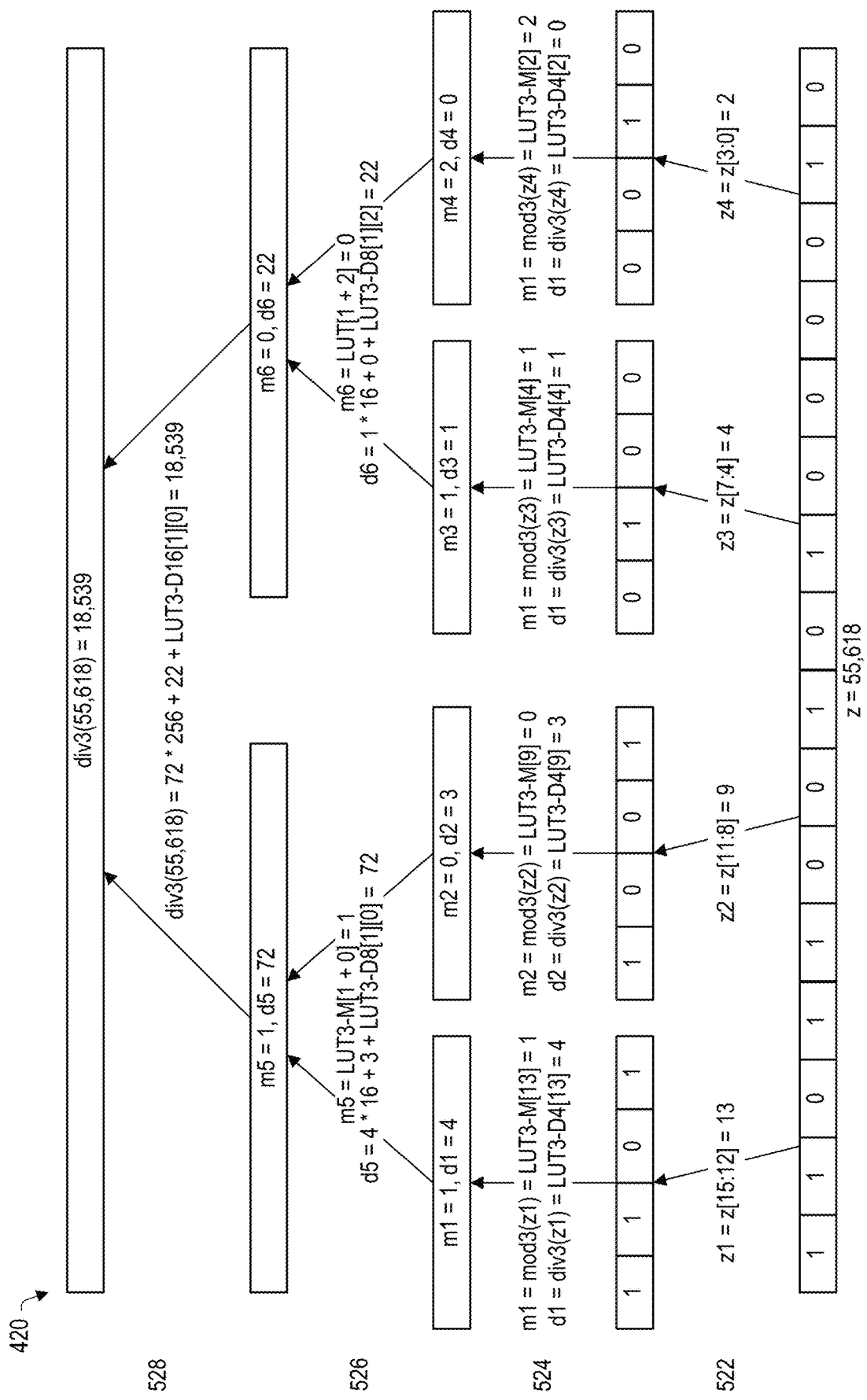

FIG. 5C illustrates the use of method 520 to compute div 3 as to a specific number—in this case, z=55,618d, which can also be written as 1101 1001 0100 0010b. In 522, the 16-bit value is split into four-bit portions, and in 524 LUT 410 is used to compute mod 3 values m1-m4 (1d, 0d, 1d, and 2d, respectively) using equation 1. Furthermore, LUT 510 is used to compute div 3 values d1-d4 (4d, 3d, 1d, and 0d, respectively). This process repeats in 526, as LUT 410 is used to find mod 3 for m1+m2 and m3+m4, yielding m5=1 and m6=0 respectively. LUT 510B is used on m1, m2 to find component (2.4), while d1*16 is component (2.1) and d2 is component (2.2) of equation (2), which yields d5. LUT510B is similarly used on m3 and m4 to find component (2.4), which is applied to equation (2) to yield d6. Finally, in 528, equation (2) is applied by adding d5*256, d6, and the result of table lookup on LUT 510C for the sum of m5 and m6, which yields div 3(55,618d)=18,539d.

The approach of method 520 can be used to compute div 3 for any 16-bit binary number. Additionally, method 520 can be extended to compute div 3 for larger values. Such computations can be performed using circuitry that includes a set of adders, LUT 410, and LUTs 510, with additional LUTs depending on the width of the input value.

Figure 5D:
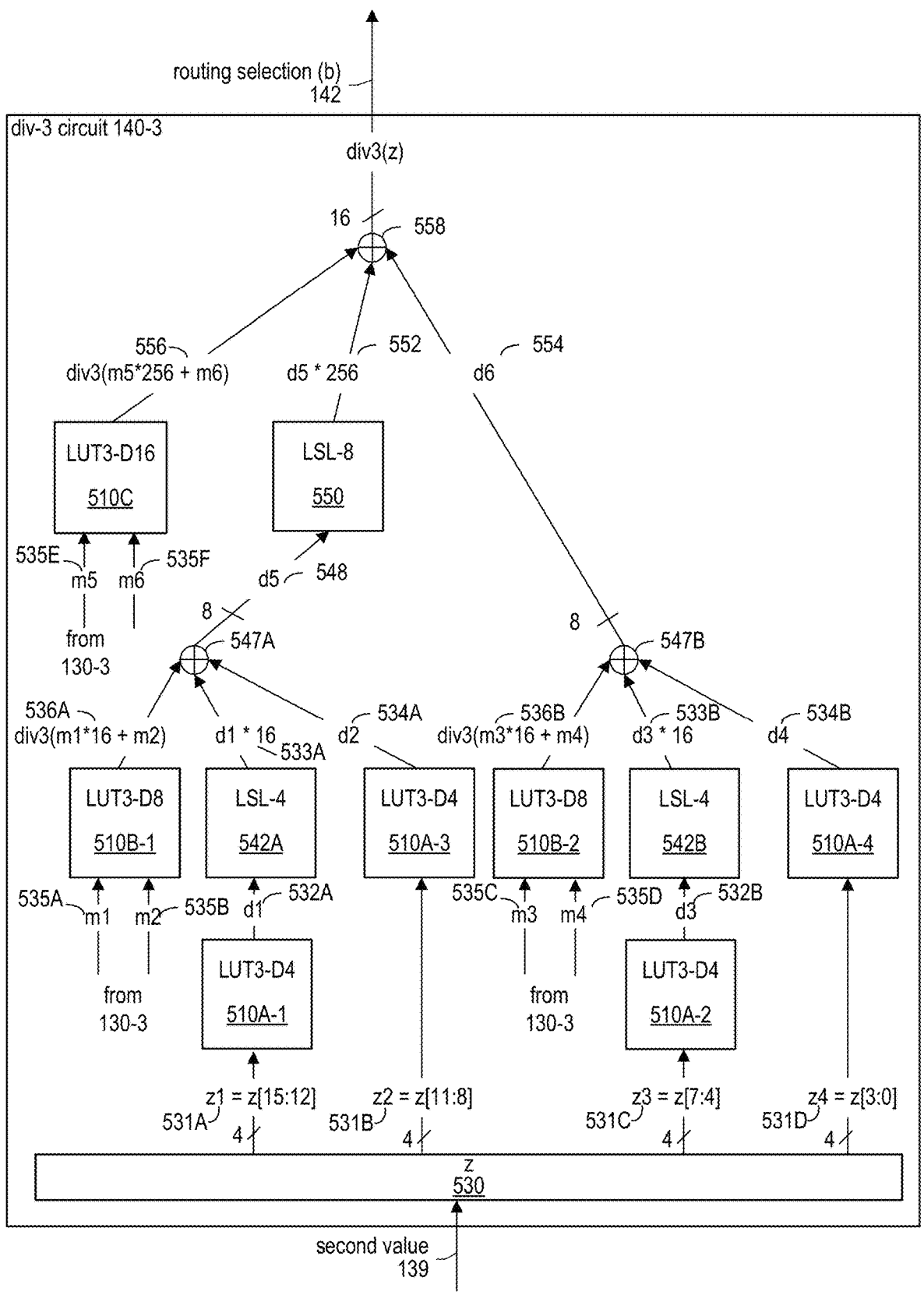
FIG. 5D illustrates one embodiment of a circuit that can be used to perform a div-3 operation.

FIG. 5D illustrates an embodiment of a div-3 circuit 140-3 that produces a 4-bit div-3 value from input second value 139, outputting routing selection 142 for dimension b.

Div-3 circuit 140-3 receives second value 139, which is 16 bits in length, and stores it in register 530 as z. The value z is split into four 4-bit vectors 531A-D: z1 (which includes z[15:12]), z2 (which includes z[11:8]), z3 (which includes z[7:4]), and z4 (which includes z[3:0]). Circuit 140-3 also receives, from mod-3 circuit 130-3, the mod-3 values for z1 (m1, indicated by reference numeral 535A), z2 (m2, indicated by reference numeral 535B), z3 (m3, indicated by reference numeral 535C), and z4 (m4, indicated by reference numeral 535D). Still further, circuit 140-3 also receives, from mod-3 circuit 130-3, mod-3 values m5 (reference numeral 535E) and m6 (reference numeral 535F), which are the mod-3 values for the most-significant 8 bits and least-significant 8 bits in z, respectively.

The operation of circuit 140-3 is first described at a high level. Circuit 140-3 initially computes div 3 for both halves of z using equation (2), in which value z has constituent values x and y. For the "left" half of z, z1 corresponds to x and z2 corresponds to y. Div 3 for these values using equation (2) is d5, indicated by reference numeral 547A. Similarly, for the "right" half of z, z3 corresponds to x and z4 corresponds to y. Div 3 for these values using equation (2) is d6, indicated by reference numeral 547B. This process is then repeated to compute div 3 for the concatenation of z=d5/d6, where d5 is constituent value x and d6 is constituent value y. The output of equation (2) for these values is routing selection 142, which can be used for dimension b.

Now the operations of each of these div 3 computations can be addressed in more detail. To compute div 3 for the left half of second value 139 (consisting of z1 and z2), equation (2) is used. In this equation z1 is x and z2 is y. Element (2.1) of this equation is generated by LSL-4 542A. Left-shift circuit 542A receives the output of LUT3-D4 510A-1, which is div 3(x), and left-shifts the input 4 bits to generate d1*16, or 533A. Element (2.2) of equation (2) is generated by LUT3-D4 510A-3, which is div 3(y), indicated by reference numeral 534A. Further, element (2.4) of equation (2) is generated by LUT3-D8 510B-1. As shown in FIG. 5A, lookup table 510B-1 takes two inputs, mod 3(x) (also referred to as m1) and mod 3(y) (also referred to as m2), and then outputs div 3 of the sum of 1) m1 left shifted by 4 bits and 2) m2. This output is indicated by reference numeral 536A. Adder 547A then sums 533A, 534A, and 536A to generate d5 (reference numeral 548), which is div 3 for the left half of second value 139.

In order to compute div 3 for the right half of second value 139 (consisting of z3 and z4), equation (2) is again used. In this equation z3 is x and z4 is y. Element (2.1) of this equation is generated by LSL-4 542B. Left-shift circuit 542B receives the output of LUT3-D4 510A-2, which is div 3(x), and left-shifts the input 4 bits to generate d3*16, or 533B. Element (2.2) of equation (2) is generated by LUT3-D4 510A-4, which is div 3(y), indicated by reference numeral 534B. Further, element (2.4) of equation (2) is generated by LUT3-D8 510B-2. As shown in FIG. 5A, lookup table 510B-2 takes two inputs, mod 3(x) (also referred to as m3) and mod 3(y) (also referred to as m4), and then outputs div 3 of the sum of 1) m3 left shifted by 4 bits and 2) m4. This output is indicated by reference numeral 536B. Adder 547B then sums 533B, 534B, and 536B to generate d6 (reference numeral 554), which is div 3 for the left half of second value 139.

Next, circuit 140-3, computes div 3(z) by applying equation (2), where z[15:8] constitutes constituent value x, and z[7:0] constitutes constituent value y. To recap, equation (2) is the sum of components (2.1), (2.2), and (2.4). The bit width for the div 3 value being calculated is 16 bits; accordingly, k=3 for this application of equation (2). Component (2.1) is a left-shifted version of div 3(x) multiplied by $2^{2^k}$, or 256. This is equivalent to shifting div 3(x) 8 bits to the left. Circuit 140-3 has already computed d5 as div 3(x). Component (2.1) is thus computed by left shifting d5 (reference numeral 548) as value 552. Component (2.2) of equation (2) is div 3(y), which has already been computed d6 as div 3(y) (reference numeral 554). Finally, component (2.4) of equation (2) is computed by LUT3-D16 (510C), which receives mod 3(x) (m5) and mod 3(y) (m6) as inputs. The output of lookup table 510C is indicated by reference numeral 556. With its components computed, equation (2) can thus be computed by summing values 552, 554, and 556 using adder 558 to produce div 3(z), which is routing selection 142, which can be used to route dimension b.

Mod 15 and Div 15 Implementation

Another possible non-power-of-two routing paradigm is based on mod 15 and div 15 computations. As shown below, elements of the approach for mod 3/div 3 can be reused here. These two examples illustrate how a design might be adapted for any needed number of routing options that is not a power of two.

The inventors have recognized that the following formulas can be used to find mod 15(z) and div 15(z), where z has a bit width of $2^{k+1}$, the most significant half of the bits of z value being computed is represented by x, and the least significant half of the bits of z is represented by y, such that z=x·$2^{2^k}$+y or x·$2^n$+y, where n=$2^k$:

$$(3)\ \mathrm{mod}\ 15(z) = \mathrm{mod}\ 15(\mathrm{mod}\ 15(x) + \mathrm{mod}\ 15(y));\ \mathrm{and}$$

$$(4)\ div15(z) = div15(x)\cdot 2^{2^k} + div15(y) + div15\left(2^{2^k}\right)\cdot \mathrm{mod}15(x) +$$
$$div15(\mathrm{mod}\ 15(x) + \mathrm{mod}\ 15(y)).$$

It can be seen that equation (3) relies on the mod-15 values of the constituent parts x and y, while equation (4) is somewhat more complex.

Equation (4) is the sum of four components:

$(4.1)\ div\ 15(x)\cdot 2^{2^k}$;

$(4.2)\ div\ 15(y)$;

$(4.3) = div15\left(2^{2^k}\right)\cdot \mathrm{mod}15(x)$;

$(4.4) = \mathrm{mod}15(x) + \mathrm{mod}15(y)$;

$(4.5) = div\ 15((4.4))$; and $div\ 15(z) = (4.1) + (4.2) + (4.3) + (4.5)$.

The values k and n will have different values depending on the size of x and y that are being combined. When x and y are each 4 bits, n=4 and k=2. When x and y are each 8 bits, n=8, and k=3.

Figure 6A:
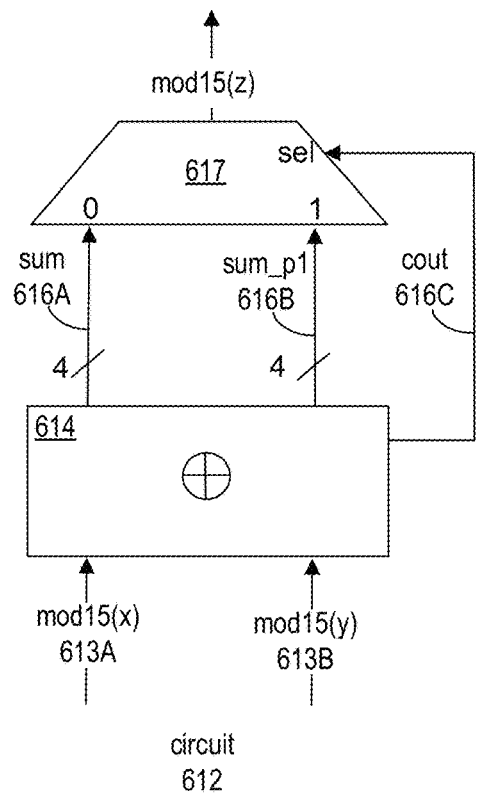
FIG. 6A illustrates a lookup table, as well as a function and a circuit that can be used to implement mod-15 functionality.

As with the mod 3/div 3 paradigms, LUTs can facilitate computing mod 15 and div 15 values. FIG. 6A shows one embodiment of a LUT 610 (also referred to as LUT15-M) that includes mod 15 values for each possible 4-bit binary number. LUT 610 therefore makes possible a quick computation of mod 15 for any 4-bit number.

As equation (3) shows, finding mod 15 for z requires finding mod 15 for the sum of mod 15(x) and mod 15(y). This sum can be wider than 4 bits. For example, if mod 15(x)=7 and mod 15(y)=14, mod 15(x)+mod 15(y)=21, which is 10101b.

Function 611 in FIG. 6A (also referred to as mod 15-F) describes one possible way to evaluate mod 15(x)+mod 15(y). This function shows the computation of two different four-bit values: (1) tmp_mod 15, which is equal to mod 15(x)+mod 15(y), and (2) tmp_mod 15_p1, which is equal to mod 15(x)+mod 15(y)+1, or formula (1) plus one. Additionally, cout is the value of the carry out of the most significant bit for tmp_mod 15_p1, which indicates that the sum is greater than 15. If cout=0, tmp_mod 15 is selected as mod 15(z); on the other hand, if cout=1, tmp_mod 15_p1 is selected as mod 15(z). The operation of this function can be seen by considering a few examples. If x=7 and y=7, tmp_mod 15=14, tmp_mod 15_p1=15, and cout=0. Because cout=0, tmp_mod 15 (14) is selected as mod 15(z). If x=7 and y=8, tmp_mod 15=15, tmp_mod 15_p1=0 (this is a four-bit output, the five-bit output would be 10000b), and cout=1. Because cout=1, tmp_mod 15_p1 (0) is selected as mod 15(z). Finally, if x=7 and y=9, tmp_mod 15=16, tmp_mod 15_p1=1 (this is a four-bit output, the five-bit output would be 10001b), and cout=1. Because cout=1, tmp_mod 15_p1 (1) is selected as mod 15(z).

One possible hardware implementation of function 611 for computing mod 15(z) is circuit 612. As shown, mod 15(x) (reference numeral 613A) and mod 15(y) (reference numeral 613B) are supplied to an adder 614 that generates two 4-bit outputs: sum 616A (equivalent to tmp_mod 15 in function 611) and sum_p1 616B (equivalent to tmp_mod 15_p1 in function 611). Adder 614 also generates cout 616C (the carry out value) with respect to the computation of sum_p1 616B. Sum 616A and sum_p1 616B are supplied to a multiplexer 617, which receives cout 616C as a select signal. If cout 616C=0, sum 616A is selected as output 618 to represent mod 15(z). If cout 616C=1, on the other hand, sum_p1 616B is selected as output 618 to represent mod 15(z). This implementation avoids the use of a larger LUT Adder 614, in other possible hardware implementations, is a compound adder that further optimizes circuit 612. Such a compound adder may compute both tmp_mod_15 and tmp_mod_15_p1 with a single compound add operation, as opposed to two separate "classical" add operations (as shown in function 611). The use of a compound adder can reduce the total number of operations required to implement function 611.

Figure 6B:
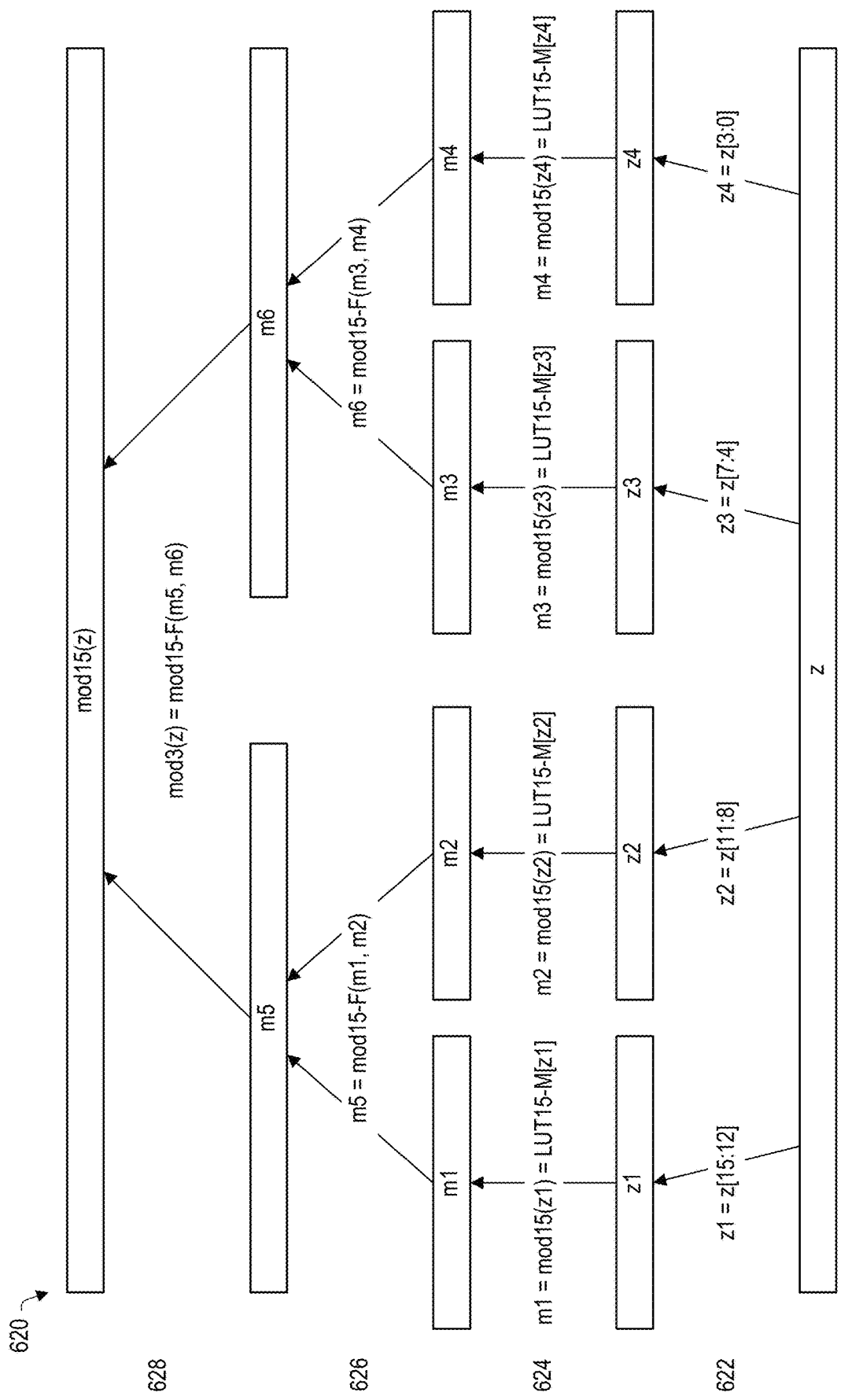
FIGS. 6B-C depict one embodiment of a method for performing a mod-15 operation.

FIG. 6B illustrates method 620, in which LUT 610A and function 611 (which may be implemented by circuit 612) are used to calculate mod 15(z) for a 16-bit value. At 622, z is split into four 4-bit vectors z1 (z[15:12]), z2 (z[11:8]), z3 (z[7:4]) and z4 (z[3:0]). At 624, mod 15 is computed for z1-z4 using LUT 610; these values are stored as m1-m4, such that m1=mod 15(z1), m2=mod 15(z2), etc. In 626, function 611 is used to implement equation (3), which combines m1 and m2 to compute mod 15 for {z1, z2} and combines m3 and m4 to compute mod 15 for {z3, z4}. The value m5 is computed by performing function 611 on m1 and m2, and m6 is computed by performing function 611 on m3 and m4. This process repeats in 628, which includes performing function 611 on m5 and m6, which yields mod 15(z). This approach can be implemented for z of any width $2^{k+1}$.

Figure 6C:
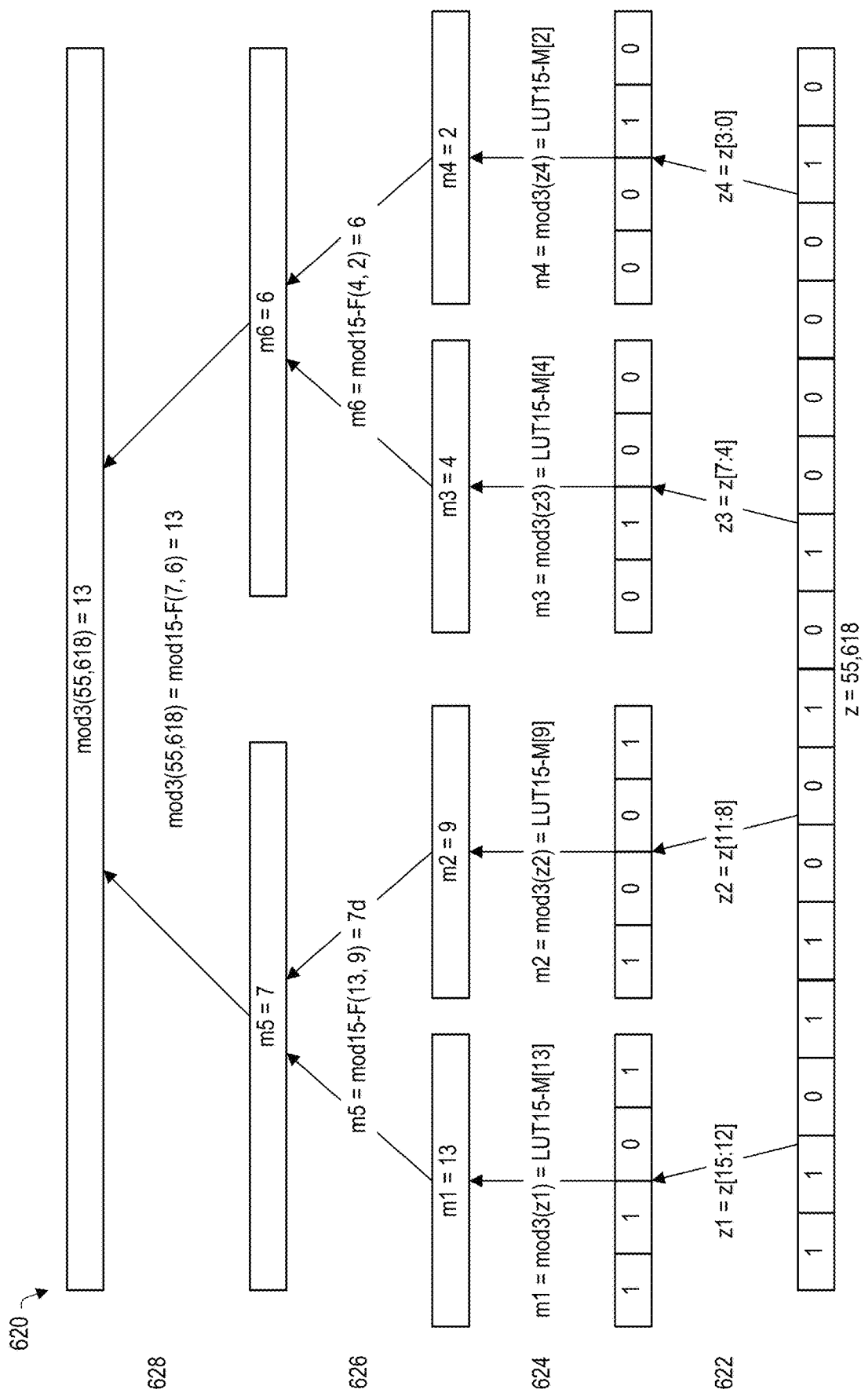

FIG. 6C illustrates the use of method 620 to compute mod 15 as to a specific number—in this case, z=55,618d, which can also be written as 1101 1001 0100 0010b. Fifteen goes into this z value 3,707 times, leaving a remainder of 13. The same result can also be computed by method 620 using mod 15 operations on constituent parts of z. In 622, the 16-bit value is split into four-bit portions, and in 624, LUT 610A is used to compute mod-15 values m1-m4 (13, 9, 4, and 2, respectively). This process repeats in 626, as m1 and m2 are used in function 611 to compute mod 15 for the sum, yielding m5=7. Similarly, m3 and m4 are added and then function 611 is used to compute mod 15 for the sum, yielding m6=6. Finally, in 628, m5 and m6 are used in function 611 to compute mod 15 for the sum, yielding mod 15 (z=55,618)=13.

Figure 6D:
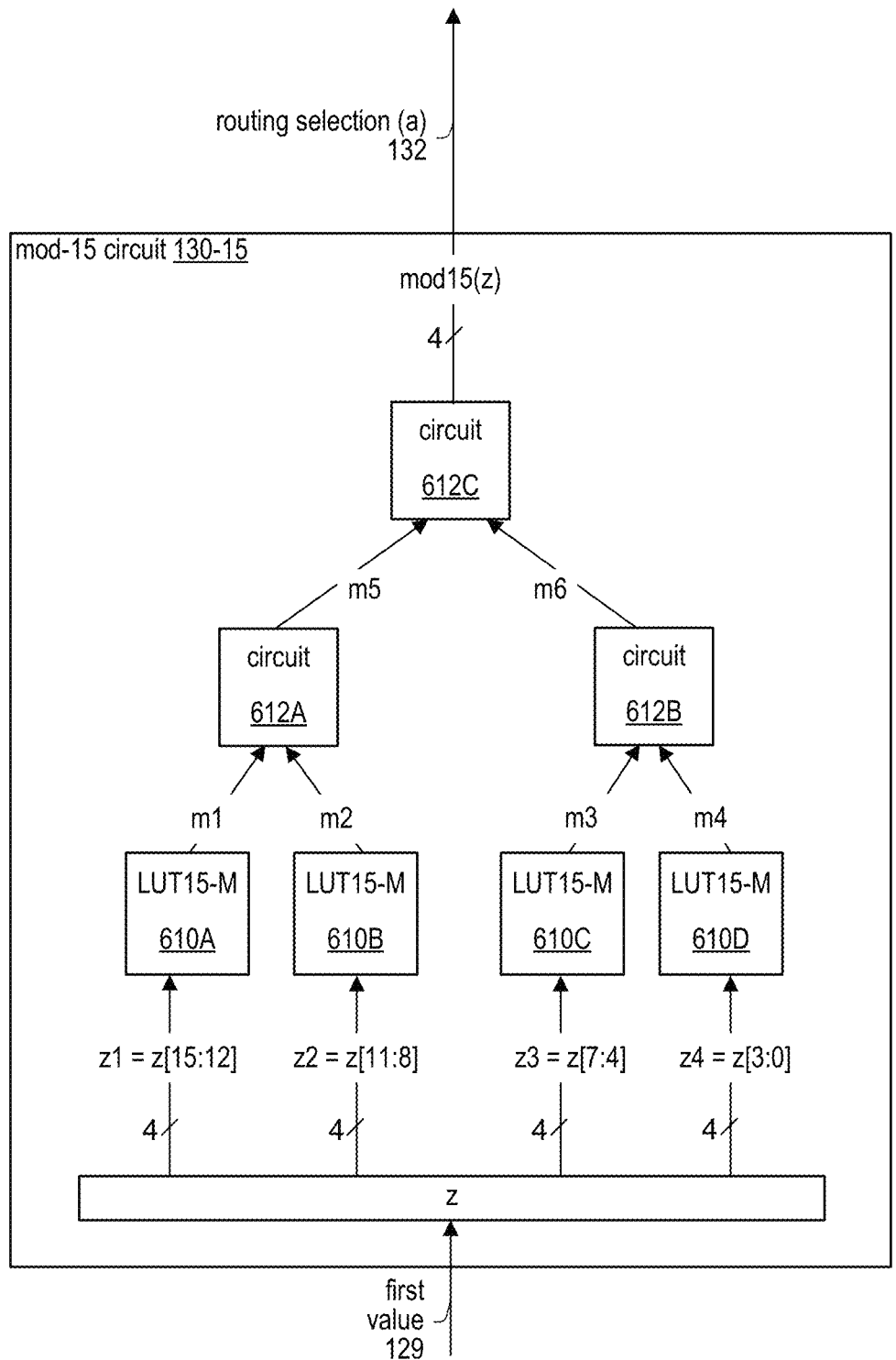
FIG. 6D illustrates one embodiment of a circuit that can be used to perform a mod-15 operation.

The approach of method 620 (which is one embodiment of method 420) can be used to compute mod 15 for any 16-bit binary number. Additionally, method 620 can be extended to compute mod 15 for larger values. Such computations can be performed using circuitry that includes a set of adders, LUT 610, and implements function 611 (e.g., with circuit 612). FIG. 6D shows one possible implementation of a mod-15 circuit 130-15. First value 129 is received as input value z. Lookup tables 610A-D (which are instantiations of lookup table 610 in FIG. 6A) then compute mod 15 for the four, four-bit components of z, labeled as outputs m1-m4. M1 and m2 are supplied to an instantiation of circuit 612 depicted in FIG. 6A (612A) to produce output m5, while m3 and m4 are supplied to a second instantiation of circuit 612 (612B) to produce output m6. The process then repeats, as m5 and m6 are supplied to a third instantiation of circuit 612 (612C). The output of 612C is a 16-bit value of mod 15(z), which can be used as the routing selection for dimension a.

LUT 610 (mod 15(x)) can be used in conjunction with function 611, other LUTs shown in FIG. 7A, left shifters and adders to compute div 15(z) according to equation (4). The various components of equation (4) may be calculated as follows: component (4.1), which multiplies a value by a power of two, can be implemented by a left shifter that operates on the output of a LUT 710A (LUT15-D4) that receives a portion of z (in a subsequent state for, component (4.1) is computed from a left-shift of d5); components (4.2) can be evaluated by using LUT 710A (also referred to as LUT15-D4), which includes div 15 values for any given value of mod 15(y); component (4.3) can be evaluated using LUTs 710B-D depending on the size of the values being combined; component (4.4) can be evaluated by an adder; and component (4.5) can also be evaluated by using LUT 710A, which includes div 15 values for values between 0-28 (the largest possible sum of mod 15(x)+mod 15(y)). More specifically, LUT 710B (LUT15-D8) is used to evaluate component (4.3) when two 4-bit numbers are being combined. (Although it is noted that the output of lookup table 710B is the same as the input, since div 15 (16) is equal to 1. As such 710B is not utilized in the circuit shown in FIG. 7D. It is included in FIG. 7A, however, to show a pattern that continues with the lookup tables in FIGS. 7C and 7D.) LUTs 710C (LUT15-D16) and 710D (LUT15-D32) are used to evaluate component (4.3) when two 8-bit or two 16-bit numbers are being combined, respectively. Lookup table 710D is not used in the examples of FIGS. 7-D, as the output is 16 bits, which means that only four-bit values and eight-bit values are being combined.

Figure 7B:
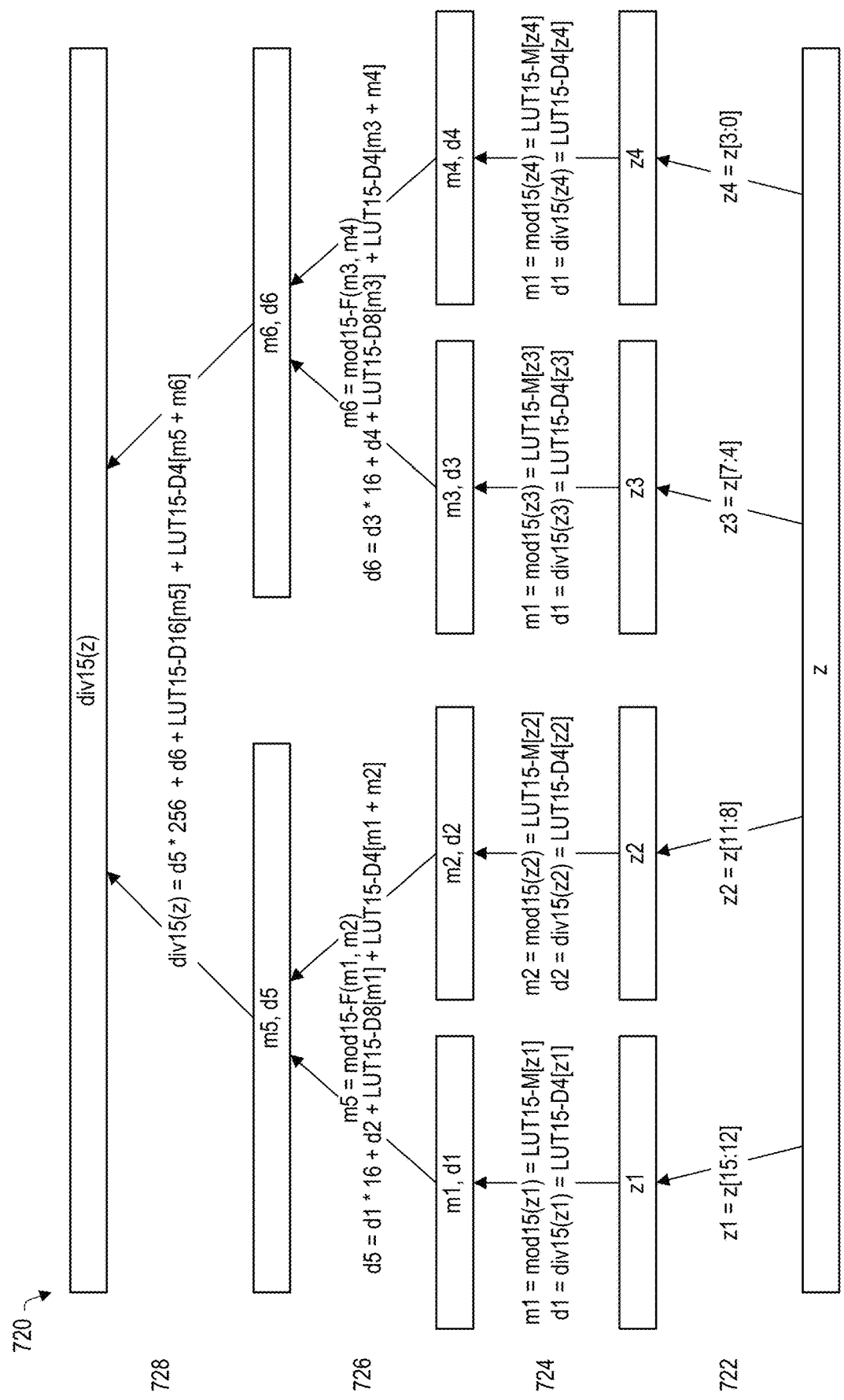
FIGS. 7B-C depict one embodiment of a method for performing a div-15 operation.

FIG. 7B illustrates method 720, in which LUTs 610 and 710 can be used alongside function 611 and other hardware to calculate div 15(z) for a 16-bit value. Similar to method 620, method 720 begins at 722, in which z is split into four 4-bit vectors z1 (z[15:12]), z2 (z[11:8]), z3 (z[7:4]) and z4 (z[3:0]). At 724, mod 15 is computed for z1-z4 using LUT 610 and div 15 is computed for z1-z4 using LUT 710A; these values are stored as m1-m4 and d1-d4, such that m1=mod 3(z1), m2=mod 3(z2), d1=div3(z1), d2=div3(z2), etc. In 726, function 611 is used to combine m1 and m2 to find m5 and to combine m3 and m4 to find m6. Equation (4) uses d1, d2, m1 and m2 to compute div 15 for {z1, z2} (d5) and uses d3, d4, m3 and m4 to compute div 15 for {z3, z4} (d6). This process repeats in 728, which includes summing the following quantities: a lookup in LUT 710C to compute component (4.3), lookups in LUT 710A to compute components (4.2) and (4.5), and a left-shift operation on d5 to compute component (4.1). The result is div 15(z).

Figure 7C:
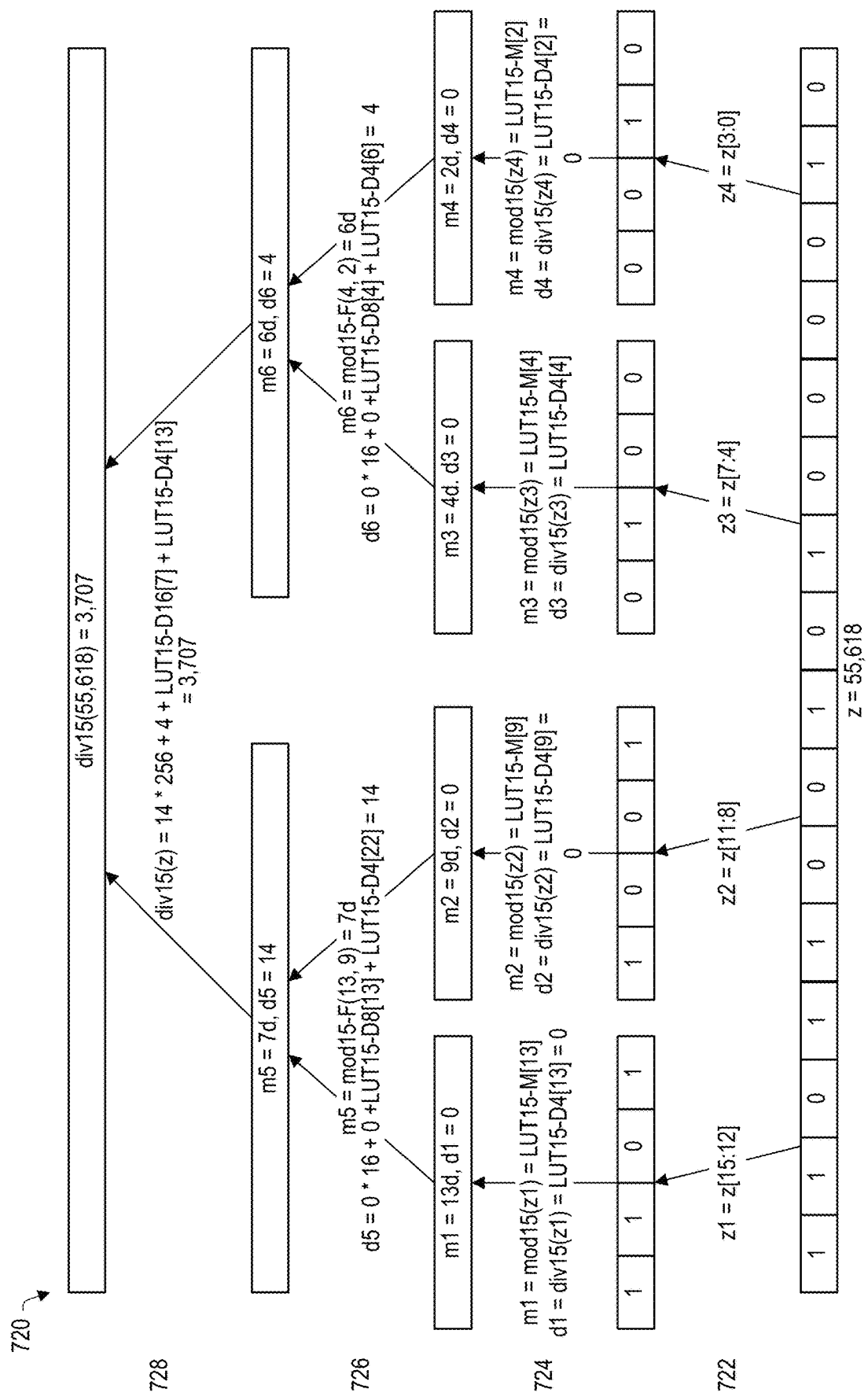

FIG. 7C illustrates the use of method 720 to compute div 15 as to a specific number—in this case, z=55,618d, which can also be written as 1101 1001 0100 0010b. In 722, the 16-bit value is split into four-bit portions, and in 724 LUT 710 is used to compute mod 15 values m1-m4 (13d, 9d, 4d, and 2d, respectively). Furthermore, LUT 710A is used to compute div 15 values d1-d4 (which are all zeros). In 726, function 611 is used to find mod 15 for m1+m2 and for m3+m4, yielding m5=7 and m6=6, respectively. In order to calculate d5, the components (4.1), (4.2), (4.3), and (4.5) are summed, where (4.5) is div 15((4.4), or mod 15(x)+mod 15(y)). Component (4.1) is computed by left shifting d1 (which in this case is 0, so (4.1) is also 0). Component (4.2) is the already-computed d2, also 0. Component (4.3) is computed by accessing LUT 710B for x=m1=13. Component (4.4) is equal to mod 15(x)+mod 15(y)=m1+m2=13+9=22. Component (4.5) is obtained by looking up the value for x=22 in LUT 710A, which is 1. The value d5 thus equals 0+0+13+1, or 14. The value d6 is evaluated is similar fashion to obtain 4.

A similar process is performed in 728. In order to calculate div 15(z), the components (4.1), (4.2), (4.3), and (4.5) are again summed. Component (4.1) is computed by left shifting d5, which is equivalent to 14*256 (28), or 3,584. Component (4.2) is the already-computed d6, which is 4. Component (4.3) is computed by accessing LUT 710C for x=m5=7, which yields 119. Component (4.4) is equal to mod 15(x)+mod 15(y)=m5+m6=7+6=13. Component (4.5) is obtained by looking up the value for x=13 in LUT 710A, which is 0. The value div 15(z) thus equals 3,584+4+119+0, or 3,707.

As with mod 15(z), div 15(z) can be implemented for z of any width $2^{k+1}$ if appropriate LUTs are implemented. For example, LUT 710D can be used to find div 15(z) when z is 32 bits. LUTs of various widths can therefore be utilized in arithmetic circuit 126 of routing circuit 120 as needed.

Figure 7D:
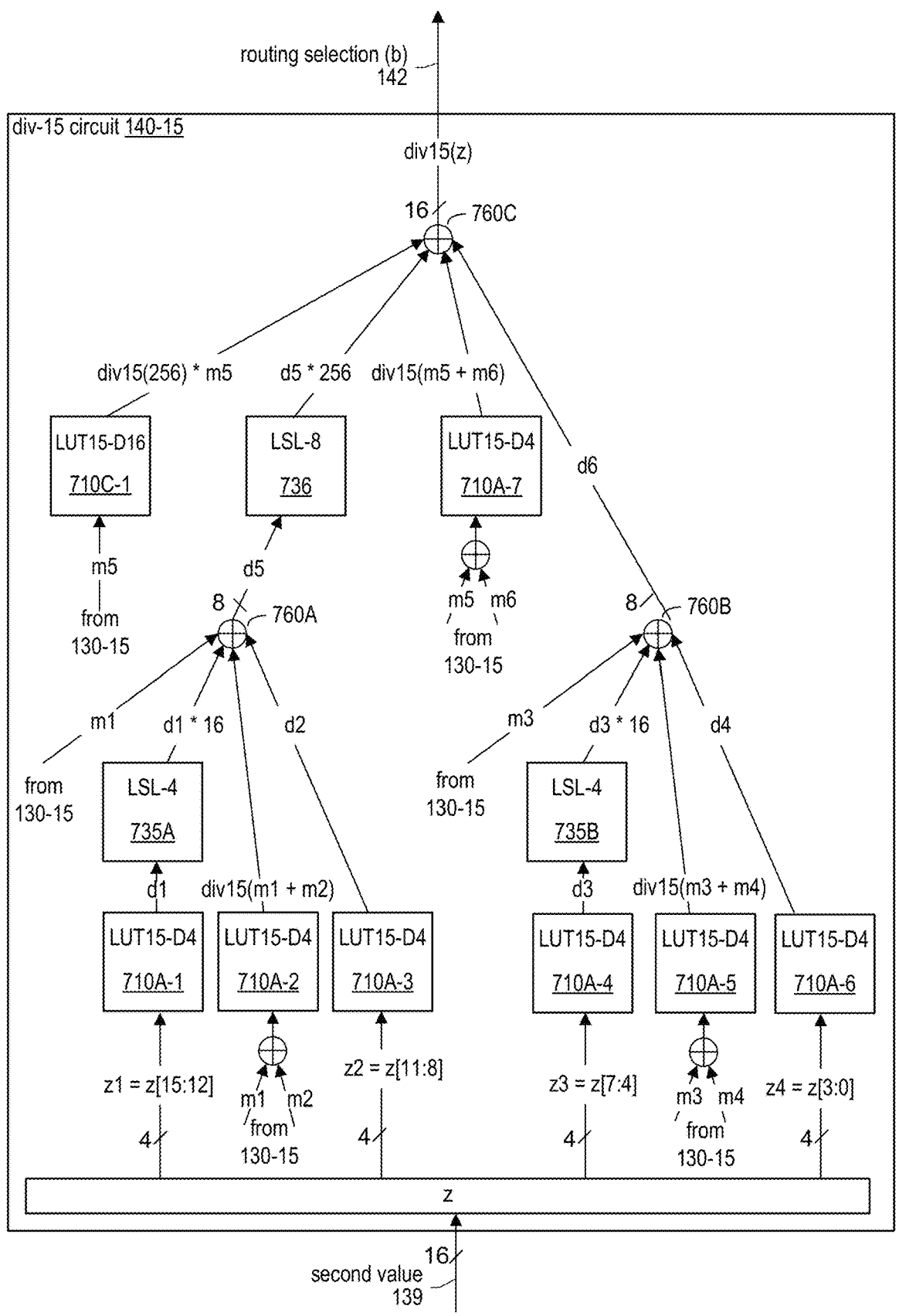
FIG. 7D illustrates one embodiment of a circuit that can be used to compute a div-operation.

FIG. 7D is a block diagram of one embodiment of a div 15 circuit 140-15. As shown, circuit 140-15 receives a value z, and utilizes lookup tables described in FIG. 7A, left-shift circuits, and adders to produce the value div 15(z). Circuit 140-15 also receives values m1, m2, m3, and m4 from circuit 130-15 (the mod 15 values for the four, four-bit components of z), as well as m5 and m6, which are the mod 15 values for both halves of z (also computed by circuit 130-15).

The operation of the circuit depicted in FIG. 7D can be seen to include three computations of equation (4). This equation is computed on the "left" half of z to produce d5, which is the output of adder 760A, the four inputs of which are the four components of equation (4). Equation (4) is again computed on the "right" half of z to produce d6, which is the output of adder 760B, which also has four inputs analogous to the inputs to adder 760A. (Note that m1 is one of the inputs to adder 760A. This addend is equivalent to component (4.3), but since div 15 (16)=1, div 15 (16)*m1 is simply equal to m1. The same observation applies for m3 and adder 760B.) Once d5 and d6 are computed, equation (4) is evaluated again using d5 and d6, as well as inputs m5 and m6 from circuit 130-15. The output of adder 760C is div 15(z), or routing selection 142 for dimension b.

Example Method

FIG. 8 is a flow diagram of one embodiment of a method 800 for performing routing selections for a computer system. In various embodiments, method 800 is performed on a routing circuit of a computer system.

Method 800 commences in step 810, in which the routing circuit (e.g., routing circuit 120) of a computer system (e.g., computer system 100) that includes a set of resources (e.g., set of resources 110) that are organized according to a topology with a plurality of dimensions receives a request for a particular resource within the set of resources. The request including an address (e.g., request address 104) having a first set of bits and a second, non-overlapping set of bits. The topology having a first dimension (e.g., dimension a) with n routing options and a second dimension (e.g., dimension b) with m routing options, where n and m are both integers greater than two, and where n is a not a power of two.

In some embodiments, the first and second sets of bits are separated within the address by an intervening set of bits, where the first value is formed by masking the address with a first mask value that includes the first and second sets of bits separated by a first intervening set of bits. The second value is formed by masking the address with a second, different mask value that includes the first and second sets of bits separated by a second intervening set of bits.

Method 800 continues in step 820, in which the routing circuit determines a first routing selection (e.g., routing selection (a)) for the first dimension by performing a modulo-n operation (e.g., mod-n 130) on a first value (e.g., first value 130) formed from the address, the first value including the first and second sets of bits. In some embodiments, the modulo-n operation includes determining a modulo-n value for each of equal sub-portions of the first value, resulting in a current set of modulo-n results. The determining is followed by combining pairs of the current set of modulo-n results to obtain a new set of modulo-n results having a greater number of bits than previous modulo-n results, with the new set of modulo-n results becoming the current set of modulo-n results. Then, the circuit repeats the combining of the current set of modulo-n results until the new set of modulo-n results has a single modulo-n result, which is a final result of the modulo-n operation on the first value. In some implementations, a given pair of the current set of modulo-n results includes a first sub-portion of the address (x) and an immediately less significant sub-portion of the address (y), and a corresponding one of the new set of modulo-n results for the given pair is equal to mod n(mod n(x)+mod n(y).

Next, in step 830, the routing circuit determines a second routing selection (e.g., routing selection (b) 142) for the second dimension by performing a div-n (e.g., div-n 140) operation on a second value (e.g., second value 139) formed from the address, the second value including the first and second sets of bits.

In some embodiments, div-n operation includes determining a div-n value for each of equal sub-portions of the second value, resulting in a current set of div-n results. The div-n operation further includes combining pairs of the current set of div-n results to obtain a new set of div-n results having a greater number of bits than previous div-n results, the new set of div-n results becoming the current set of div-n results. Still further, the div-n operation includes repeating the combining of the current set of div-n results until the new set of div-n results has a number of bits equal to a number of bits of the second value. In some implementations, a given pair of the current set of div-n results includes a first sub-portion of the address (x') and an immediately less significant sub-portion of the address (y'). A corresponding one of the new set of div-n results for the given pair is equal to div n(x')·$2^{2^k}$+div n(y')+div n(mod n(x')·$2^{2^k}$+mod n(y')), where the second value has bit width $2^{2^{k+1}}$.

In step 840, the routing circuit activates one or more selection signals (e.g., selection signals 150 for dimensions a & b) in accordance with the first and second routing selections. The one or more selection signals are usable to cause the particular resource to be selected in response to the request.

Method 800 can further comprise, in some embodiments, checking a set of constraints to prevent aliasing. The checking the second set of constraints for the first and second dimensions may include, in some cases, ensuring that the first and second sets of intervening bits each include an even number of zeroes and an even number of ones.

Example Device

Figure 9:
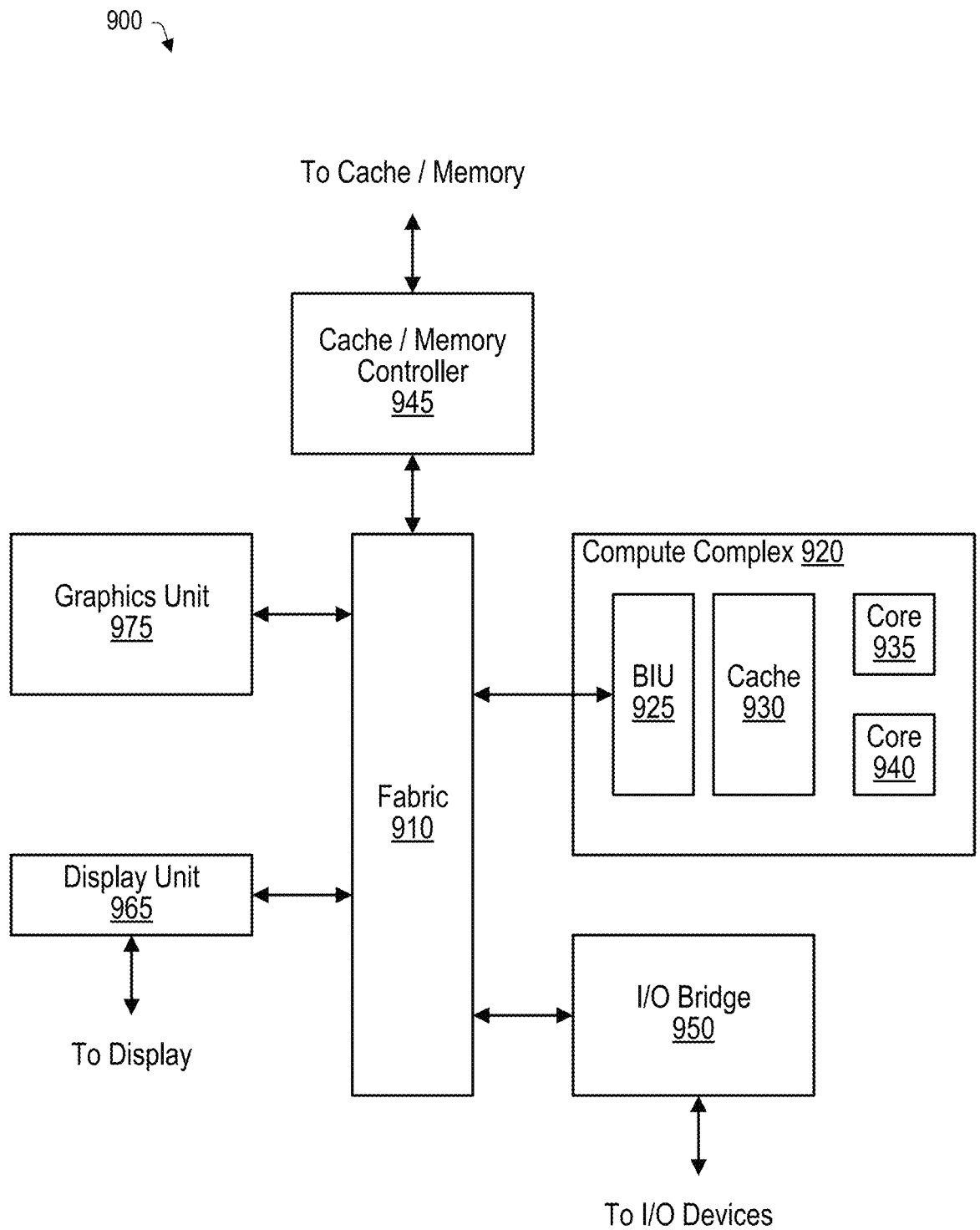
FIG. 9 is a block diagram illustrating an example computing device for implementing the disclosed techniques.

Referring now to FIG. 9, a block diagram illustrating an example embodiment of a device 900 is shown. In some embodiments, elements of device 900 may be included within a system on a chip. In some embodiments, device 900 may be included in a mobile computing device, which may be battery-powered. Therefore, power consumption by device 900 may be an important design consideration. In the illustrated embodiment, device 900 includes fabric 910, compute complex 920 input/output (I/O) bridge 950, cache/memory controller 945, graphics unit 975, and display unit 965. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Graphics unit 975 may include one or more processors, e.g., one or more graphics processing units (GPU's). Graphics unit 975 may receive graphics-oriented instructions, such as OPENGL®, Metal, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 900 with connectivity to various types of other devices and networks.

Example Applications

Figure 10:
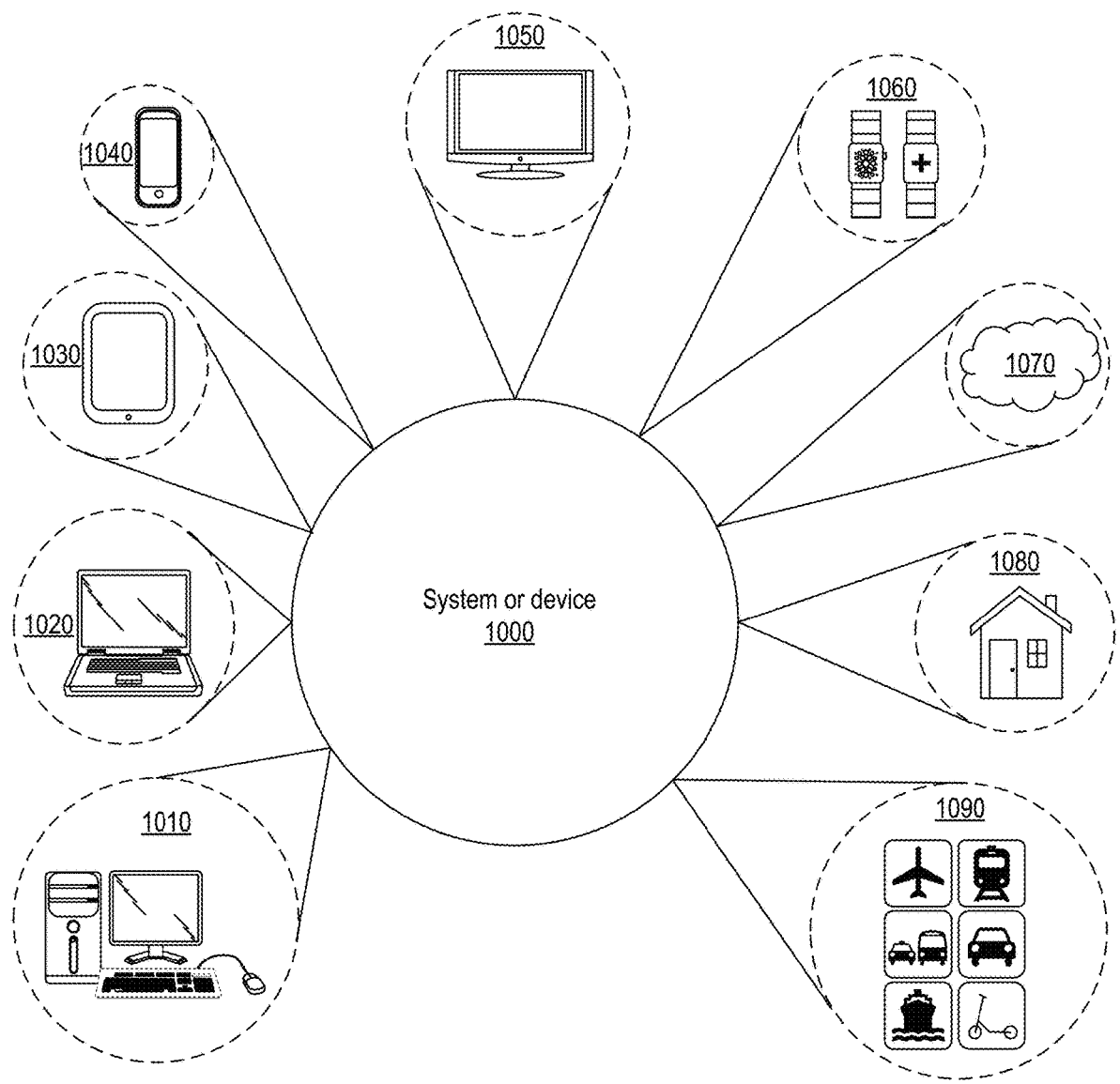
FIG. 10 is a diagram illustrating example applications for systems and devices employing the disclosed techniques.

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 11:
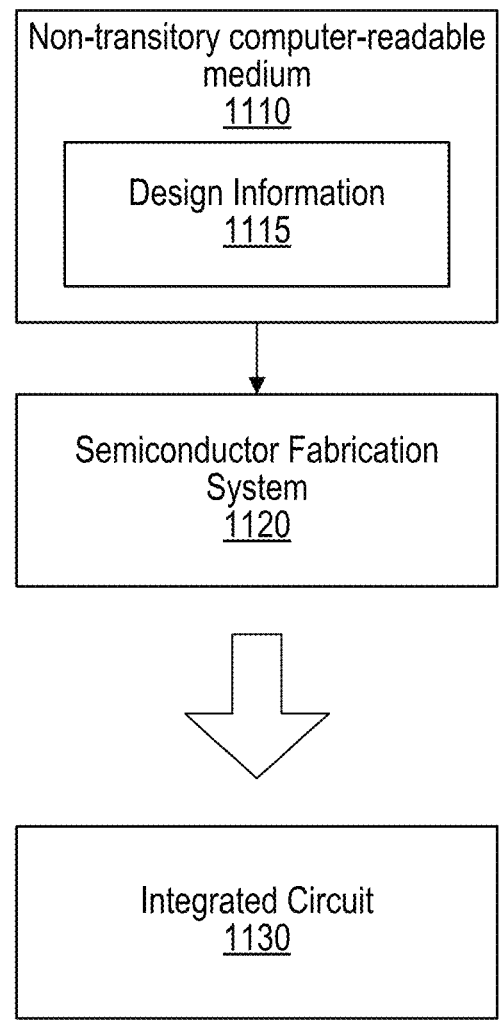
FIG. 11 is a block diagram illustrating an example computer-readable medium that stores circuit design information for implementing devices that employ the disclosed techniques.

FIG. 11 is a block diagram illustrating an example non-transitory computer-readable storage medium that stores circuit design information, according to some embodiments. In the illustrated embodiment semiconductor fabrication system 1120 is configured to process the design information 1115 stored on non-transitory computer-readable medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system 1120. In some embodiments, design information 1115 may also include one or more cell libraries which specify the synthesis, layout, or both of integrated circuit 1130. In some embodiments, the design information is specified in whole or in part in the form of a netlist that specifies cell library elements and their connectivity. Design information 1115, taken alone, may or may not include sufficient information for fabrication of a corresponding integrated circuit. For example, design information 1115 may specify the circuit elements to be fabricated but not their physical layout. In this case, design information 1115 may need to be combined with layout information to actually fabricate the specified circuitry.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
 a plurality of resources of a computer system that are organized according to a routing topology having a plurality of dimensions that includes a first dimension and a second dimension, the first dimension having n routing options, wherein $2^a<n<2^b$, and a and b are consecutive positive integer values;
 a routing circuit configured to:
  receive an address indicative of a particular resource of the plurality of resources; and
  determine a first routing value for the first dimension by performing a mod-n operation on a first masked value formed using the address, wherein the first masked value includes more than b bits; and
 wherein the first routing value is usable to select the particular resource.

2. The apparatus of claim 1, wherein the routing circuit is configured to determine a second routing value for the second dimension by performing a div-n operation on a second masked value formed using the address, wherein the second masked value includes more than b bits, and wherein the second routing value is also usable to select the particular resource.

3. The apparatus of claim 2, wherein the particular resource is a memory location within a memory subsystem of the computer system.

4. The apparatus of claim 3, wherein the plurality of dimensions includes a memory controller dimension, a memory bank dimension, a row dimension, and a column dimension.

5. The apparatus of claim 2, wherein the first masked value and the second masked value are formed by masking the address with a first mask value and a second mask value, respectively, and wherein the first mask value and the second mask value have a set of constraints that prevent aliasing scenarios in which two different addresses hash to a same set of routing determinations for the plurality of dimensions.

6. The apparatus of claim 2, wherein the first masked value and the second masked value are formed by masking the address with a first mask value and a second, different mask value, respectively.

7. The apparatus of claim 2, wherein the routing circuit is configured to:
 form the first masked value by masking the address with a first mask value, the first masked value including a first set of b bits and a second set of c bits separated by a first set of intervening bits, wherein the second dimension has $2^c$ routing options; and
 form the second masked value by masking the address with a second mask value, the second masked value including a third set of b bits and a fourth set of c bits separated by a second set of intervening bits.

8. The apparatus of claim 7, wherein the highest and lowest bits in the first and second mask values are identical, and between these highest and lowest bits in the first and second mask values there are an even number of zeros and an even number of ones in both the first mask value and the second mask value.

9. The apparatus of claim 1, wherein n=3, a=1, b=2, and the first masked value includes at least 7 bits.

10. A method, comprising:
 receiving, at a routing circuit, an address indicative of a particular resource of a plurality of resources within a computer system, wherein the plurality of resources are organized according to a routing topology having a plurality of dimensions that includes first and second dimensions, the first dimension having n routing options, wherein $2^a<n<2^b$, a and b are positive integers, and b=a+1; and
 masking, by the routing circuit using a first mask value, the address to produce a first masked value having more than b bits; and
 determining, by performing a mod-n operation on the first masked value, a first routing value for the first dimension, the first routing value being usable to access the particular resource.

11. The method of claim 10, further comprising:
 masking, by the routing circuit using a second mask value, the address to produce a second masked value having more than b bits; and
 determining, by performing a div-n operation on the second masked value, a second routing value for the second dimension, the second routing value being usable to access the particular resource.

12. The method of claim 11, wherein the first and second mask values are different.

13. The method of claim 11, wherein the first masked value includes fewer bits that the address and has a first set of b bits and a second set of c bits separated by a first set of intervening bits, and wherein the second dimension has $2^c$ routing options; and
 wherein the second masked value has a same number of bits as the first masked value and includes a third set of b bits and a fourth set of c bits separated by a second set of intervening bits.

14. The method of claim 13, wherein portions of the first and second mask values corresponding to the first set of intervening bits and the second set of intervening bits in the first and second mask values are different.

15. An apparatus, comprising:
 a memory subsystem of a computer system having storage locations organized according to a topology having a plurality of dimensions that includes first and second dimensions, the first dimension having n routing options, wherein n is a non-power-of-two positive integer, and wherein $2^b$ is the smallest power-of-two integer greater than n;

a routing circuit configured to:

receive an address indicative of a particular storage location within the memory subsystem, wherein a subset of bits in the address jointly encodes routing selections for the first and second dimensions; and determine a first routing value for the first dimension by performing a mod-n operation on a first masked value formed from the address, wherein the first masked value includes more than b bits, and wherein the first routing value is usable to select the particular storage location.

16. The apparatus of claim 15, wherein the routing circuit is configured to:

determine a second routing value for the second dimension by performing a div-n operation on a second masked value formed from the address, wherein the second masked value includes more than b bits, and wherein the second routing value is usable to select the particular storage location.

17. The apparatus of claim 16, wherein the first masked value and the second masked value are formed by masking the address with a first mask value and a second, different mask value, respectively.

18. The apparatus of claim 16, wherein the first masked value and the second masked value are formed by masking the address with a first mask value and a second mask value, respectively, the first and second mask values being defined in order to prevent aliasing scenarios in which two different addresses hash to a same set of routing determinations for the plurality of dimensions.

19. The apparatus of claim 16, wherein the routing circuit is configured to:

form the first masked value by masking the address with a first mask value, the first masked value including a first set of b bits and a second set of c bits separated by a first set of intervening bits, wherein the second dimension has $2^c$ routing options; and form the second masked value by masking the address with a second mask value, the first masked value including a third set of b bits and a fourth set of c bits separated by a second set of intervening bits.

20. The apparatus of claim 19, wherein portions of the first and second mask values corresponding to the first set of intervening bits and the second set of intervening bits in the first and second masked values each include an even number of zeroes and an even number of ones.

* * * * *